(12) United States Patent
Cherkasova et al.

(10) Patent No.: US 8,326,970 B2
(45) Date of Patent: Dec. 4, 2012

(54) SYSTEM AND METHOD FOR MODELING A SESSION-BASED SYSTEM WITH A TRANSACTION-BASED ANALYTIC MODEL

(75) Inventors: Ludmila Cherkasova, Sunnyvale, CA (US); Qi Zhang, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 562 days.

(21) Appl. No.: 11/935,196

(22) Filed: Nov. 5, 2007

(65) Prior Publication Data
US 2009/0119301 A1 May 7, 2009

(51) Int. Cl.
*G06F 15/173* (2006.01)
*G06F 15/16* (2006.01)

(52) U.S. Cl. ........ 709/224; 709/225; 709/226; 709/228; 709/229; 709/235

(58) Field of Classification Search .................. 709/224, 709/225, 226, 228, 229, 235
See application file for complete search history.

(56) References Cited

U.S. PATENT DOCUMENTS

| | | | |
|---|---|---|---|
| 4,849,879 A | 7/1989 | Chinnaswamy et al. | |
| 5,283,897 A | 2/1994 | Georgiadis et al. | |
| 5,446,874 A | 8/1995 | Waclawsky et al. | |
| 5,544,310 A | 8/1996 | Forman et al. | |
| 5,644,717 A | 7/1997 | Clark | |
| 5,655,081 A | 8/1997 | Bonnell et al. | |
| 5,668,995 A | 9/1997 | Bhat | |
| 5,732,218 A | 3/1998 | Bland et al. | |
| 5,742,754 A | 4/1998 | Tse | |
| 5,781,449 A | 7/1998 | Rosborough | |
| 5,781,703 A | 7/1998 | Desai et al. | |
| 5,787,254 A | 7/1998 | Maddalozzo et al. | |
| 5,812,780 A | 9/1998 | Chen et al. | |
| 5,819,066 A | 10/1998 | Bromberg et al. | |
| 5,864,662 A | 1/1999 | Brownmiller et al. | |
| 5,905,868 A | 5/1999 | Baghai et al. | |
| 5,964,891 A | 10/1999 | Caswell et al. | |
| 6,006,260 A | 12/1999 | Barrick et al. | |
| 6,086,618 A * | 7/2000 | Al-Hilali et al. | ............... 703/2 |
| 6,108,700 A | 8/2000 | MacCabee et al. | |
| 6,108,782 A | 8/2000 | Fletcher et al. | |
| 6,138,157 A | 10/2000 | Welter et al. | |
| 6,157,618 A | 12/2000 | Boss et al. | |
| 6,157,940 A | 12/2000 | Marullo et al. | |
| 6,167,534 A | 12/2000 | Strasthof et al. | |
| 6,205,413 B1 | 3/2001 | Bisdikian et al. | |

(Continued)

OTHER PUBLICATIONS

U.S. Appl. No. 11/742,525, filed Apr. 30, 2007, Rolia et al.

(Continued)

*Primary Examiner* — Ashok Patel
*Assistant Examiner* — Lawrence Cosby

(57) ABSTRACT

According to an embodiment of the present invention, a method for deriving an analytic model for a session-based system is provided. The method comprises receiving, by a model generator, client-access behavior information for the session-based system, wherein the session-based system comprises a plurality of interdependent transaction types. The method further comprises deriving, by the model generator, from the received client-access behavior information, a stateless transaction-based analytic model of the session-based system, wherein the derived transaction-based analytic model models resource requirements of the session-based system for servicing a workload. According to certain embodiments, the derived transaction-based analytic model is used for performing capacity analysis of the session-based system.

21 Claims, 16 Drawing Sheets

U.S. PATENT DOCUMENTS

| | | | |
|---|---|---|---|
| 6,216,169 B1 | 4/2001 | Booman et al. | |
| 6,243,105 B1 | 6/2001 | Hoyer et al. | |
| 6,324,492 B1 | 11/2001 | Rowe | |
| 6,336,138 B1 | 1/2002 | Caswell et al. | |
| 6,397,066 B1* | 5/2002 | Servi | 455/446 |
| 6,411,998 B1 | 6/2002 | Bryant et al. | |
| 6,434,513 B1 | 8/2002 | Sherman et al. | |
| 6,446,028 B1 | 9/2002 | Wang | |
| 6,446,120 B1 | 9/2002 | Dantressangle | |
| 6,449,739 B1 | 9/2002 | Landan | |
| 6,457,142 B1 | 9/2002 | Klemm et al. | |
| 6,470,464 B2 | 10/2002 | Bertman et al. | |
| 6,477,483 B1 | 11/2002 | Scarlat et al. | |
| 6,505,246 B1 | 1/2003 | Land et al. | |
| 6,519,714 B1 | 2/2003 | Sweet et al. | |
| 6,606,658 B1 | 8/2003 | Uematsu | |
| 6,643,613 B2 | 11/2003 | McGee et al. | |
| 6,694,288 B2 | 2/2004 | Smocha et al. | |
| 6,738,933 B2 | 5/2004 | Fraenkel et al. | |
| 6,862,623 B1 | 3/2005 | Odhner et al. | |
| 6,898,564 B1 | 5/2005 | Odhner et al. | |
| 7,002,960 B1 | 2/2006 | Golan et al. | |
| 7,082,441 B1 | 7/2006 | Zahavi et al. | |
| 7,117,118 B2 | 10/2006 | Kalos et al. | |
| 7,171,668 B2 | 1/2007 | Molloy et al. | |
| 7,401,143 B2 | 7/2008 | Oulu et al. | |
| 7,415,453 B2 | 8/2008 | Suzuki et al. | |
| 7,424,530 B2 | 9/2008 | Chagoly et al. | |
| 7,434,204 B1 | 10/2008 | Everingham et al. | |
| 7,437,450 B1 | 10/2008 | Gore et al. | |
| 7,499,994 B2 | 3/2009 | Sapiro et al. | |
| 7,505,415 B2 | 3/2009 | Murgatroyd et al. | |
| 7,506,044 B2 | 3/2009 | Doshi et al. | |
| 7,565,610 B2 | 7/2009 | Li et al. | |
| 7,636,711 B2 | 12/2009 | Rizzi et al. | |
| 7,640,342 B1 | 12/2009 | Aharoni et al. | |
| 7,657,499 B2 | 2/2010 | Newman et al. | |
| 7,673,191 B2 | 3/2010 | Addleman et al. | |
| 7,676,706 B2 | 3/2010 | Addleman et al. | |
| 7,698,417 B2 | 4/2010 | Rizzi et al. | |
| 7,711,803 B2 | 5/2010 | Doshi et al. | |
| 7,725,572 B1 | 5/2010 | Kautzleben | |
| 7,730,051 B2 | 6/2010 | Falardeau et al. | |
| 7,734,763 B2 | 6/2010 | Budzisch et al. | |
| 7,734,775 B2 | 6/2010 | Barnett et al. | |
| 7,757,214 B1 | 7/2010 | Palczak et al. | |
| 2002/0083371 A1 | 6/2002 | Ramanathan et al. | |
| 2002/0099521 A1 | 7/2002 | Yang et al. | |
| 2002/0099816 A1 | 7/2002 | Quarterman et al. | |
| 2002/0105911 A1 | 8/2002 | Pruthi et al. | |
| 2002/0120727 A1 | 8/2002 | Curley et al. | |
| 2002/0138226 A1 | 9/2002 | Doane | |
| 2002/0156688 A1* | 10/2002 | Horn et al. | 705/26 |
| 2002/0198749 A1 | 12/2002 | Tomlin et al. | |
| 2003/0065702 A1 | 4/2003 | Singh et al. | |
| 2003/0225563 A1 | 12/2003 | Gonos | |
| 2005/0005012 A1 | 1/2005 | Odhner et al. | |
| 2005/0021530 A1 | 1/2005 | Garg et al. | |
| 2005/0091640 A1 | 4/2005 | McCollum et al. | |
| 2005/0102121 A1 | 5/2005 | Odhner et al. | |
| 2005/0102318 A1 | 5/2005 | Odhner et al. | |
| 2005/0108380 A1 | 5/2005 | Odhner et al. | |
| 2005/0138170 A1 | 6/2005 | Cherkasova et al. | |
| 2005/0278439 A1 | 12/2005 | Cherkasova | |
| 2005/0278453 A1 | 12/2005 | Cherkasova | |
| 2006/0013134 A1 | 1/2006 | Neuse | |
| 2006/0089982 A1 | 4/2006 | Abbott et al. | |
| 2006/0235664 A1 | 10/2006 | Vinberg et al. | |
| 2008/0281564 A1 | 11/2008 | Suzuki et al. | |

OTHER PUBLICATIONS

U.S. Appl. No. 11/742,519, Rolia et al.
U.S. Appl. No. 11/742,530, Rolia et al.
U.S. Appl. No. 11/684,569, Cherkasova et al.
U.S. Appl. No. 11/935,196, Cherkasova et al.
U.S. Appl. No. 11/546,632.
U.S. Appl. No. 11/492,738.

"Capacity Planning for WebLogic Portal," URL: http://edocs.bea.com/wlp/docs81/capacityplanninq/capacityplanning.html, May 21, 2007.

"The Workload for the SPECweb96 Benchmark," URL: http://www.spec.org/osg/web96/workload.html, Standard Performance Evaluation Corporation, May 21, 2007.

"TPC-W Benchmark," URL: http://www.tpc.org, Jun. 4, 2007.

Almeida, V., Bestavros, A., Crovella, M., de Oliveira, A., "Characterizing Reference Locality in the WWW," Technical Report, Boston University, TR-96-11, 1996.

Arlitt, M. and Williamson, C., "Web Server Workload Characterization: The Search for Invariants (Extended Version)," Department of Computer Science, University of Saskatchewan, 57 Campus Drive, Saskatoon, SK, Canada S7N 5A9, Mar. 15, 1996.

Arlitt, M. and Williamson, C., "Web Server Workload Characterization: The Search for Invariants," Department of Computer Science, University of Saskatchewan, SIGMETRICS '96 May 1996 PA, pp. 126-137.

Arlitt, M., Krishnamurthy, D., and Rolia, J., "Characterizing the Scalability of a Large Web-based Shopping System," ACM Transactions on Internet Technology, vol. 1, N 1, pp. 44-69, Aug. 2001.

Box, G.E.P., and G. Jenkins and G. Reinsel; "Time Series Analysis: Forecasting and Control:" Prentice Hall, Upper Saddle River, NJ, USA, 3rd Edition, 1994.

Chakravarti, I., Laha, R., and Roy, J, "Handbook of Methods of Applied Statistics," vol. I, John Wiley and Sons, pp. 392-394, 1967.

Chase, J.S., Anderson, D., Thakar, P., Vandat, A. and Doyle, R., "Managing Energy and Server Resources in Hosting Centers," Department of Computer Science, Duke University.

Cherkasova, L. and Tang, L. "Sizing the Streaming Media Cluster Solution for a Given Workload," In Proc. of the 4th IEEE/ACM CCGrid 2004, Chicago, USA, Apr. 2004.

Draper, N.R. and H. Smith, "*Applied Regression Analysis*;" John Wiley & Sons, New York, NY. USA, 3rd Ed., 1998.

Engle, R.F., "Autoregressive Conditional Heteroscedasticity with Estimates of the Variance of United Kingdom Inflation." Econometrica, 50(4): pp. 987-1008,1982.

Hartigan, J.A., Wong, M.A., "A K-Means Clustering Algorithm," *Applied Statistics*, vol. 28, pp. 100-108, 1979.

Jain, R., "The Art of Computer Systems Performance Analysis: Techniques for experimental Design, Measurement, Simulation, and Modeling," Wiley-Interscience, NY, 1991.

Kachigan, T.M., "A Multi-Dimensional Approach to Capacity Planning," In Proc. of CMG Conference 1980, Boston, MA, 1980.

Kelly, T. and Zhang, A. "Predicting Performance in Distributed Enterprise Applications," Hewlett-Packard Labs Tech Report, HPL-2006-76, May 2006.

Kelly, T., "Detecting Performance Anomalies in Global Applications," Second Workshop on Real, Large Distributed Systems, WORLDS '2005, San Francisco, Ca., Dec. 2005.

Klerk, L. and Bender, J., "Capacity Planning," URL: http://www.microsoft.com/technet/archive/itsolutions/ecommerce, Microsoft TechNet, 2000.

Menasce, D., Almeida, V., and Dowdy, L., "Capacity Planning and Performance Modeling: from Mainframes to Client-Server Systems," Prentice Hall, 1994.

Ranjan, S. and Rolia, J., Fu, H., and Knightly, E., "QoS-Driven Server Migration for Internet Data Centers," In Proc. of IWQoS 2002, Miami, FL, May 2002.

Rolia, J. and Vetland, V., "Correlating Resource Demand Information with ARM Data for Application Services," In Proc. of the ACM Workshop on Software and Performance, 1998.

Rolia, J., Cherkasova, L., Arlitt, M. and Andrzejak, A., "A Capacity Management Service for Resource Pools," In Proc. of the Fifth Intl. Workshop on Software and Performance, 2005.

Sarris, D. and Hofer, J., "Capacity Planning for e-Commerce Systems With Benchmark Factory," URL:http://www.dltcom/quest/.

Urgaonkar. B., and G. Pacifici, P. Shenoy, M. Spreitzer, and A. Tantawi; "An Analytical Model for Multi-tier Internet Services and its Applications," In Proc. of the ACM SIGMETRICS'2005, Banff, Canada, Jun. 2005.

Urgaonkar, B., Shenoy, P., Chandra, A., and Goyal, P., "Dynamic Provisioning of Multi-tier Internet Applications," In Proc. Of the 2nd IEEE International Conference on Autonomic Computing (ICAC-05), Seattle, Jun. 2005.

Villela, D., Prashant, P., and Rubenstein, D., "Provisioning Servers in the Application Tier for E-Commerce Systems," In Proc. of IWQoS'04, Montreal, Canada, 2004.

Wimmer, M., and V. Nicolescu and D. Gmach and M. Mohr and A. Kemper and H. Kremer; "Evaluation of Adaptive Computing Concepts for Classical ERP Systems and Enterprise Services"; Proceedings of the IEEE Joint Conference on E-Commerce Technology and Enterprise Computing, E-Commerce and E-Services (CEC '06 and EEE '06); San Francisco, California, USA, Jun. 2006.

Final Office Action dated Jun. 23, 2011, U.S. Appl. No. 11/684,569, filed Mar. 9, 2007.

Office Action dated Mar. 3, 2011, U.S. Appl. No. 11/684,569, filed Mar. 9, 2007.

\* cited by examiner

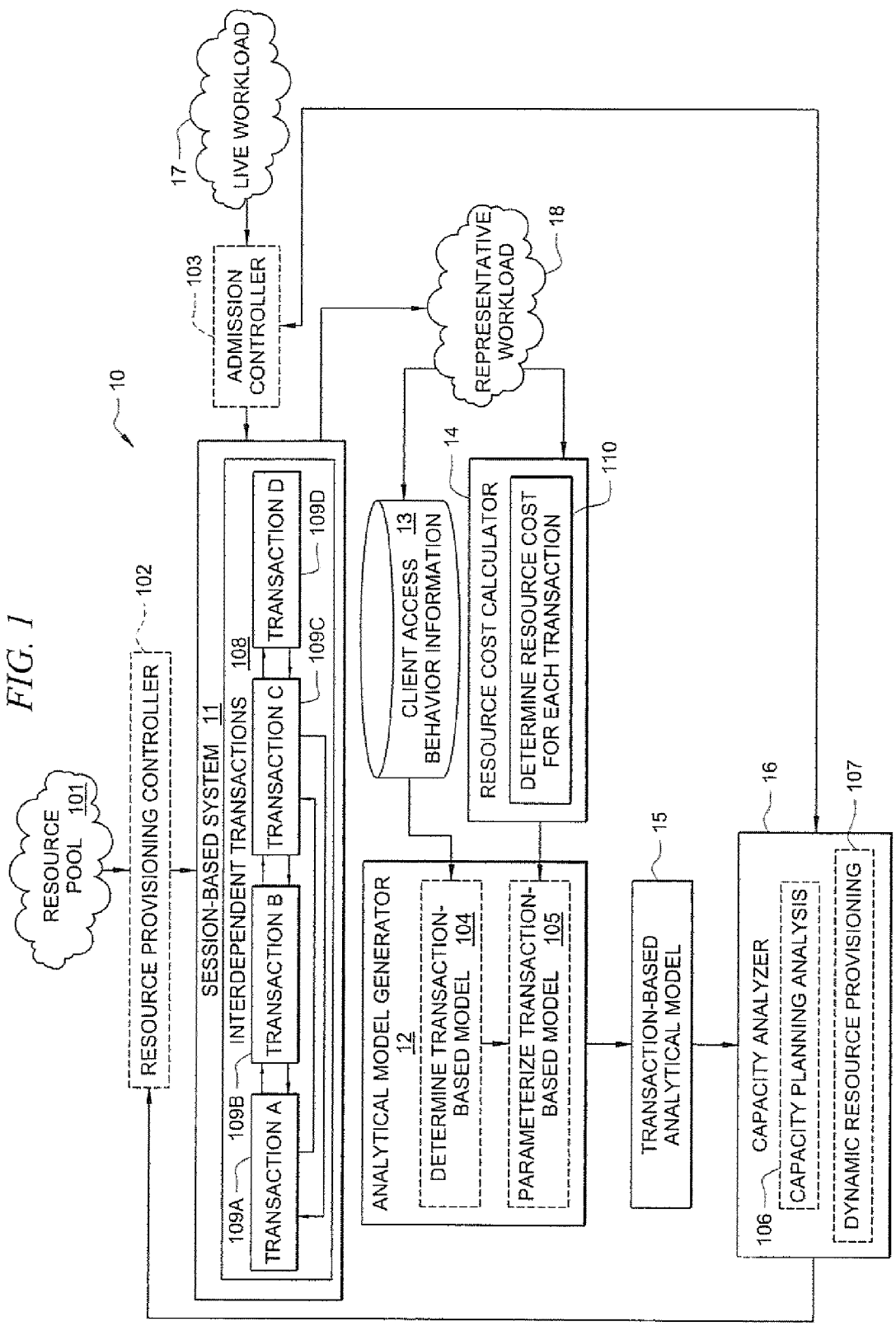

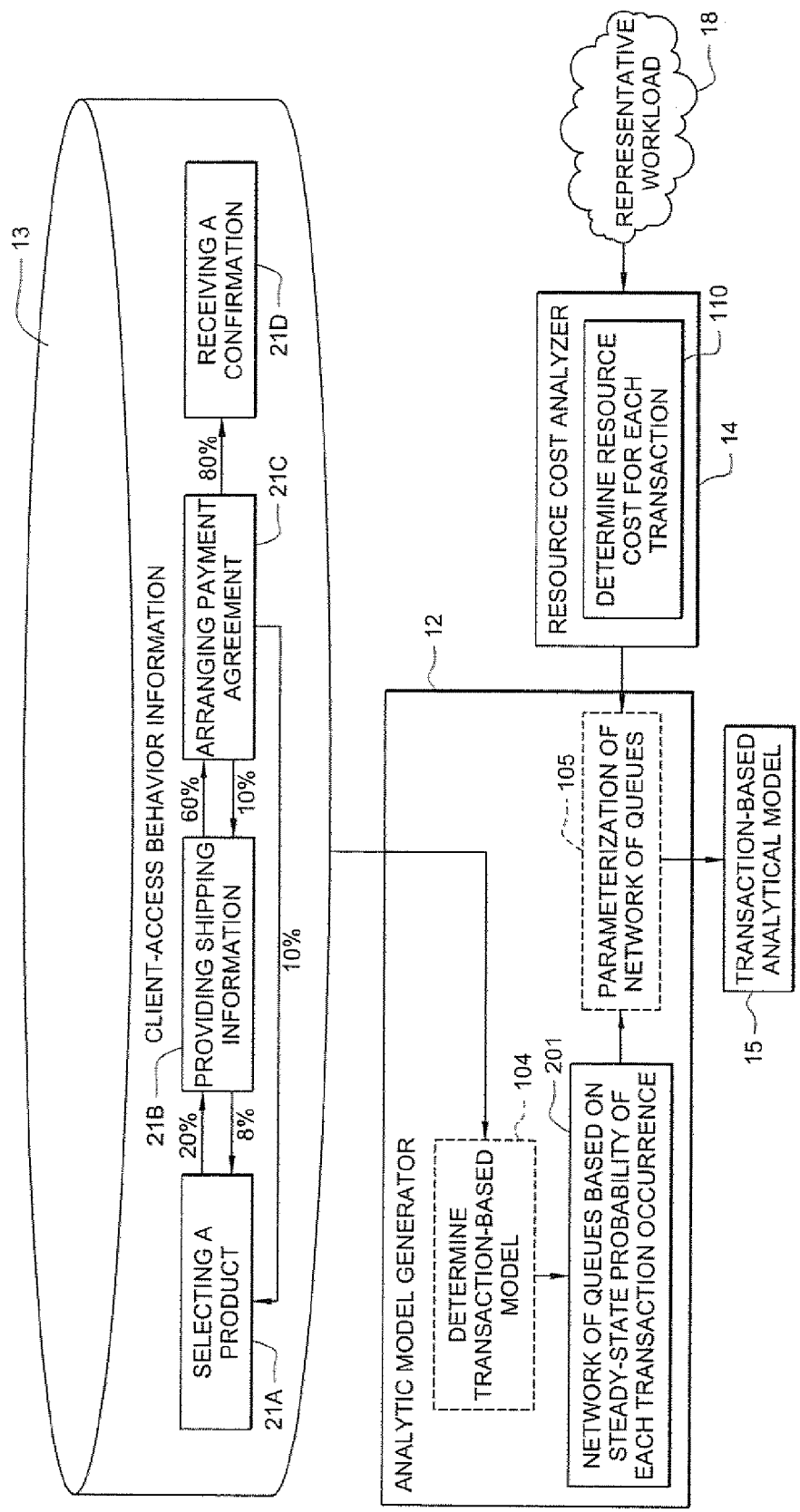

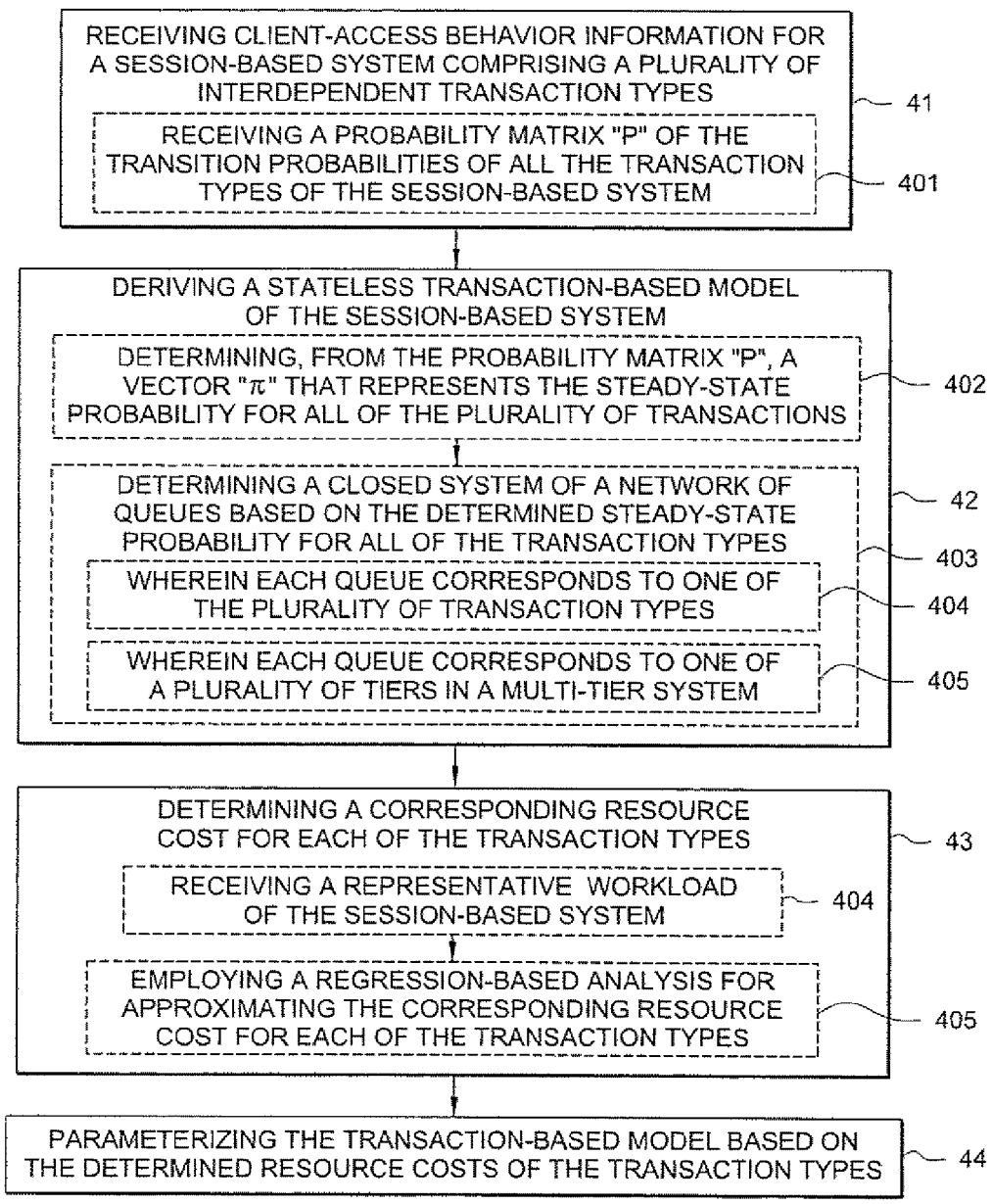

SYSTEM AND METHOD FOR MODELING A SESSION-BASED SYSTEM WITH A TRANSACTION-BASED ANALYTIC MODEL

CROSS-REFERENCE TO RELATED APPLICATIONS

The present application relates to the following co-pending and commonly-assigned U.S. patent applications: 1) U.S. patent application Ser. No. 11/684,563 filed Mar. 9, 2007 titled "REGRESSION-BASED SYSTEM AND METHOD FOR DETERMINING RESOURCE COSTS FOR COMPOSITE TRANSACTIONS", 2) U.S. patent application Ser. No. 11/684,567 filed Mar. 9, 2007 titled "SYSTEM AND METHOD FOR DETERMINING A SUBSET OF TRANSACTIONS OF A COMPUTING SYSTEM FOR USE IN DETERMINING RESOURCE COSTS", and 3) U.S. patent application Ser. No. 11/684,569 filed Mar. 9, 2007 titled; "SYSTEM AND METHOD FOR CAPACITY PLANNING FOR COMPUTING SYSTEMS", the disclosures of which are hereby incorporated herein by reference.

TECHNICAL FIELD

The following description relates generally to capacity analysis for computer systems, and more particularly to systems and methods for determining a transaction-based analytic model of a session-based system, wherein the transaction-based analytic model may be employed for analyzing capacity of the session-based system for servicing a given workload.

DESCRIPTION OF RELATED ART

Today, computer systems are delivering (e.g., via computer networks, such as the Internet) a large array of business, government, and personal services. Similarly, mission critical operations, related to scientific instrumentation, military operations, and health services, are making increasing use of computer systems and computer networks for delivering information and distributed coordination. For example, many users are accessing service providers' computer systems via the Internet seeking such services as personal shopping, airline reservations, rental car reservations, hotel reservations, on-line auctions, on-line banking, stock market trading, as well as many other services being offered by service providers via computer networks, such as the Internet. Therefore, many service providers are competing in such electronic forum. Accordingly, it is important for such service providers (sometimes referred to as "content providers") to provide high-quality services. To do so, it has become desirable for such service providers to perform appropriate capacity planning and/or resource provisioning to ensure that they can adequately service the demands placed on their systems by their clients in a desired manner (e.g., provide responses to requests in sufficiently fast time, etc., such as by serving responsive web pages to a requesting client within 8 seconds and/or satisfy some other quality of service target).

As information technology ("IT") and application infrastructures, such as those employed by the above-mentioned service providers for serving their clients, have become more complex, predicting and controlling the issues surrounding system performance and capacity planning have become a difficult (and sometimes overwhelming) task to many organizations. For larger IT projects, it is not uncommon for the cost factors related to performance tuning, performance management, and capacity planning to result in the largest and least controlled expense. Application performance issues have an immediate impact on customer satisfaction. A sudden slowdown of an enterprise-wide application can affect a large population of customers, can lead to delayed projects, and ultimately can result in company financial loss.

Large-scale enterprise development projects are increasingly relying on Service-Oriented Architecture (SOA) design. This approach provides a collection of mechanisms and interfaces for a dynamic enterprise IT environment to connect applications where the classic, data-processing legacy systems can be integrated with agile web-based front-end applications. Application servers have emerged to provide a standardized platform for developing and deploying scalable enterprise systems. The application servers are often considered a core component of an enterprise system and an integral part of a new trend toward building SOAs.

Multi-tier architectures are also commonly being employed. For instance, the three-tier architecture paradigm has become an industry standard for building scalable client-server applications. In a typical three-tier architecture for an application, the application comprises the following three tiers: 1) an interface tier (sometimes referred to as the presentation tier), 2) an application tier (sometimes referred to as the logic or business logic tier), and 3) a data tier (e.g., database tier). The first tier provides a user interface, such as a graphical user interface (GUI), with which the user may interact with the other tiers. The second tier provides functional process logic, which may comprise one or more separate modules running on a workstation or application server, for example. The application tier may, in some implementations, be multi-tiered itself (in which case the overall architecture may be called an "n-tier architecture"). The third tier manages the storage and access of data for the application. Typically, a relational database management system (RDBMS) on a database server or mainframe contains the data storage logic of the third tier. The three tiers are developed and maintained as independent modules, often on separate platforms. Quite often the first and second tiers may be implemented on common hardware (i.e., on a common platform), while the third tier is implemented on a separate platform, but any arrangement of the three tiers (i.e., either on common hardware or across separate hardware) may be employed in a given implementation. The three-tier architecture is generally intended to allow any of the three tiers to be upgraded or replaced independently as requirements, desires, and/or technology change. For example, a change of operating system from Microsoft Windows™ to Unix™ may only affect the user interface code.

As an example, suppose that a service provider develops a web application that provides banking services to clients via the web. In this example, the banking application may comprise a user interface tier that defines the user interface with which the clients interact to perform desired banking transactions. The banking application may further comprise an application tier that defines the business logic and functionality of the banking application. The banking application may further comprise a data tier that is operable to manage access of the clients' respective account balance data, for example. In such multi-tiered systems, frequent calls to application servers and data storage (e.g., databases) may place a heavy load on these resources and may cause throughput bottlenecks and high server-wide processing latency.

Traditionally, preliminary system capacity estimates are performed for service provider systems by using synthetic workload or benchmarks which are created to reflect a "typical application behavior" for "typical client requests". While this performance evaluation approach can be useful at the initial stages of design and development of a future system, it is often inadequate for answering more specific questions about an existing system that is deployed in a service provider's environment. In many cases, the workload actually encountered by a deployed system does not correspond with the synthetic workload that was expected for the system, and thus the preliminary system capacity estimates may be inadequate. Further, the techniques used for arriving at the preliminary system capacity estimates are unable to answer specific capacity planning questions that a given service provider may have about the capacity of the deployed system. And, the preliminary system capacity estimates are insufficient for performing dynamic resource provisioning in response to changes in the workload being encountered by the deployed system.

Further still, evaluating the capacity of a deployed system based on a representative workload of the deployed system, such as an actual historical workload encountered by the deployed system (or current workload being encountered by the system), may be difficult and/or compute-intensive, particularly when the representative workload of the system is session-based. In general, as used herein, a session is defined as a sequence of interdependent individual transactions. As an example, a client access to a web service, such as an e-commerce web site, commonly occurs in the form of a session. For instance, placing an order through an e-commerce web site (such as an online bookstore) may involve a session-based access, where the session includes such interdependent transactions as selecting a product, providing shipping information, arranging payment agreement, and finally receiving a confirmation. In such a session-based system, the transactions that may be encountered in the system's workload are interdependent. That is, there are explicit transaction dependencies in session-based systems, e.g., "an order" cannot be submitted to an e-commerce system unless the previous transactions have resulted in "an item being selected/ordered". The capacity of such a session-based system may be measured by the number of concurrent client sessions that the system (e.g., multi-tier system) can support without violating pre-defined quality of service targets, such as pre-defined limits in average transaction response times.

In many cases, the individual transactions are each composite transactions, which may further add difficulty and/or compute-intensiveness for the capacity evaluation. In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page), and thus the given transaction for serving the information may be considered a composite transaction as it involves various transactions for serving the objects that form such information. Determining a resource cost associated with serving such composite transactions may be desired for evaluating capacity of a computing system, but techniques for so determining such resource costs, particularly in a manner that is not compute prohibitive are lacking in traditional capacity planning systems.

In order to properly perform capacity planning and/or resource provisioning, effective models of complex enterprise systems are desired. However, accurate and efficient models of session-based systems are lacking in the art. Session-based systems, which are often implemented by multi-tiered architectures, are becoming increasingly prevalent, and thus a desire for an accurate and efficient model of such systems that can be used for analyzing the capacity of the session-based system under a given workload, such as for capacity planning and/or dynamic resource provisioning has arisen. For instance, as multi-tiered architectures are now established as the industry standard that allows for integration of new, agile web applications with legacy (e.g., database) systems, the desire for effective models of such systems has arisen. Self-adaptive resource provisioning in such systems is often desired to provide swift responses to workload changes. The need for fast response has led to a desire for an appropriate model that can, for example, quickly determine resource provisioning for a system to supply desired performance targets. Thus, a desire exists for an appropriate model that can efficiently drive system provisioning for session-based systems. In Next Generation Data Centers (NGDC) (see e.g., D. Lampman, "Building the Next Generation of IT", available at URL www.hpl/hp.com/news/2006/apr-jun/technology.html), where server virtualization provides the ability to slice larger, underutilized physical servers into smaller, virtual ones, fast and accurate performance models become instrumental for enabling applications to automatically request necessary resources and support design of utility services.

BRIEF DESCRIPTION OF THE DRAWINGS

FIG. 1 shows an exemplary system according to an embodiment of the present invention;

FIG. 2 shows an exemplary system according to one embodiment for generating a transaction-based analytic model;

FIG. 3 shows an exemplary operational flow according to an embodiment of the present invention;

FIG. 4 shows an operational flow of an analytic model generator according to one embodiment of the present invention;

DETAILED DESCRIPTION

Figure 5:
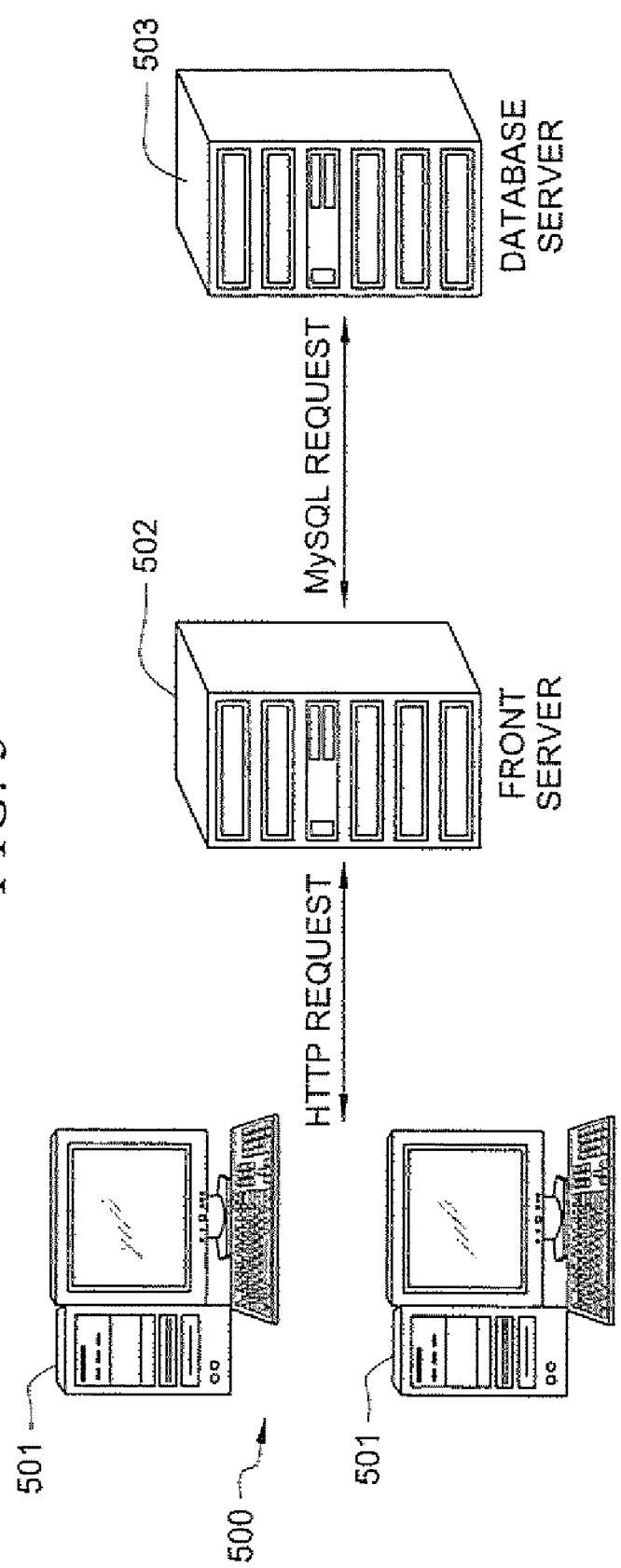
FIG. 5 shows an exemplary test-bed of a multi-tier application employed for a case study of an embodiment of the present invention.

Various embodiments of the present invention are now described with reference to the above figures, wherein like reference numerals represent like parts throughout the several views. As described further below, embodiments of the present invention provide a system and method for generating a transaction-based analytic model for modeling a session-based system. The transaction-based analytic model is stateless, and it provides an efficient and accurate model for representing a session-based system (which is not stateless). In certain embodiments, the stateless transaction-based model is derived based on the probabilistic transaction mixes observed for the session-based system being modeled. For instance, in one embodiment, the analytic model employs a closed system of queues (e.g., where each queue represents a tier of a multi-tier system being modeled). A corresponding cost for each transaction is also determined, and used for parameterizing the transaction-based model.

For example, a session-based e-commerce application may comprise such transactions as 1) searching for a product, 2) selecting a product, 3) inputting shipping information, and 4) inputting payment information. In certain embodiments, a representative workload of the session-based application may be evaluated to determine client-access behavior information, such as a probability matrix of the transition probabilities of all the transaction types. As used herein, "client-access behavior" is an inventor-defined term that refers generally to the actions (or behavior) of clients in the session-based application, such as behavior causing the client's access to transition from one transaction of the session-based application to another transaction. For instance, the probability matrix may identify the corresponding probability, based on client behavior observed in the representative workload, that a client accessing the "searching for a product" transaction type will next transition to the "selecting a product" transaction type. Similarly, the matrix may identify the corresponding probability that a client accessing the "searching for a product" transaction type will next transition to the "inputting shipping information" transaction type. Further, the matrix may identify the corresponding probability that a client accessing the "selecting a product" transaction type will next transition to the "inputting shipping information" transaction type or will next transition back to the "searching for a product" transaction type, and so on. The matrix may identify the corresponding probabilities of a client access transitioning from any one of the transaction types to any other one of the transaction types in the session-based application.

From the probabilistic transaction mixes observed for the session-based system, a model representing the steady-state access probability of all of the transaction types is derived. For instance, a vector $\pi$ may be derived from the observed probability matrix, wherein such vector $\pi$ represents the steady-state probability of all transaction types, i.e., $\pi_i$ gives the overall percentage of transactions of type i in a workload of the system, such as those observed in a representative workload or expected in any future-encountered workload, based on the observed transition probabilities of the matrix. This steady-state probability information may be utilized to implement a transaction-based model for a session-based system. For instance, in a transaction-based model derived for modeling a multi-tier system according to one embodiment, each tier has the same transaction mix as the session-based system being modeled, but the transaction type in each tier is selected according to the stationary probabilities $\pi$. In such a transaction-based model, each transaction arriving in the system is treated as if totally independent of other transactions (whereas the transactions of the session-based application being modeled are in actuality interdependent, as discussed above), while the overall transaction distribution is the same as in the system with session-based behavior.

By approximating the corresponding resource costs (e.g., service time) of each transaction type in a workload, the transaction-based model can be utilized to evaluate capacity of the session-based system for serving such workload. According to certain embodiments, the representative workload of the session-based system being modeled is evaluated to approximate a corresponding resource cost (e.g., CPU utilization cost) associated with each transaction type of a session, and the transaction-based model is parameterized with the determined resource costs for use in accurately and efficiently determining capacity of the session-based system under a given workload. In one embodiment, a statistical regression analysis is employed to efficiently approximate resource costs (e.g., CPU demands) for the different transaction types of a session-based application.

The representative workload from which the above-described client-access behavior and/or resource costs are determined may, in some embodiments, be data representing an actual historical workload encountered by the session-based system under analysis. Thus, embodiments of the present invention may be employed to analyze a "live" workload of a deployed system, which may enable more accurate analysis and planning for the system beyond the traditional preliminary system capacity estimates mentioned above.

Once derived, the transaction-based analytic model may be employed to model resource requirements of the session-based system for servicing a given workload (e.g., in accordance with pre-defined quality of service coals). Thus, certain embodiments of the present invention further provide systems and methods for employing such a transaction-based analytic model for performing capacity analysis of a session-based system, such as for performing capacity planning for the session-based system and/or for performing dynamic resource provisioning for such session-based system for servicing its current workload.

Effective analytic models can enable powerful and simple solutions for dynamic resource provisioning. The need for swift changes and timely performance predictions argues against the use of traditional simulation models and is in part responsible for the revival of classic analytic techniques for performance prediction that are based on simplified queuing networks (see e.g., 1) B. Urgaonkar, P. Shenoy, A. Chandra, and P. Goyal, "Dynamic Provisioning of Multi-tier Internet Applications", In *Proc. of the 2nd IEEE International Conference on Autonomic Computing (ICAC-05)*, Seattle, June 2005; 2) B. Urgaonkar, G. Pacifici, P. Shenoy, M. Spreitzer and A. Tantawi, "An Analytical Model for Multi-tier Internet Services and its Applications", In *Proc. of the ACM SIGMETRICS'2005*, Banff Canada, June 2005; and D. Villela, P. Pradhan, D. Rubenstein, "Provisioning Servers in the Application Tier for E-Commerce Systems", In *Proc. of IWQoS'04*, Montreal, Canada, 2004). The advantage of such analytic models relates to their ability of providing a contained abstraction of the system by considering flows of customers (requests) in the queuing network (tiers). The effectiveness of the modeling ability of the queuing network relates to whether this abstraction is done properly. If salient characteristics of the system workload are captured well within the abstraction, then simple queuing network models can be effective in predicting the performance of complex systems. Naturally, more detailed workload models that capture multi-class behavior (i.e., the resource demands of different classes of customers) can be more effective than single class workloads where different user behaviors are aggregated into a single one.

A further challenge is the sensitivity of analytic models to their parameterization. Measurements in real systems cannot provide accurate workload "demands" (i.e., execution times without any delays due to queuing) in each tier/server (i.e., queue). Approximate workload demands are extrapolated using measurements at very low utilization levels or at nearly 100% utilization (see e.g., B. Urgaonkar, G. Pacifici, P. Shenoy, M. Spreitzer, and A. Tantawi, "An Analytical Model for Multi-tier Internet Services and its Applications", In *Proc. of the ACM SIGMETRICS'2005*, Banff, Canada, June 2005). Variability across different customer behaviors further exacerbates the problem by requiring measurements of a large number of flows to accurately model the workload. An additional point relates to the fact that the workload is session-based rather than transaction-based. Each user session comprises WI assortment of transactions, which in turn comprise processing many smaller objects and database queries (i.e., each transaction of a session may be a "composite transaction", as discussed further herein). Consequently, detailed measurements, although necessary to increase model accuracy, become totally impractical.

Certain embodiments of the present invention provide a practical solution to the above problems by laying out a modeling framework which illustrates how to use information at the transaction level to effectively model session-based workloads. According to certain embodiments, the effectiveness of the proposed framework is based on a regression-based methodology to approximate resource (e.g., CPU) demands of transactions on a given hardware. This regression-based solution can "absorb" some level of uncertainty or noise present in real-world data by effectively "compacting" information on workload demands within a few model parameters. An additional benefit of certain embodiments is simplicity: according to certain embodiments, the methodology is not intrusive and is based on monitoring data that are typically available in enterprise production environments.

As mentioned above, the multi-tier implementation has become the industry standard for developing scalable client-server enterprise applications. For instance, the well-known three-tier architecture is commonly employed, which comprises: 1) an interface tier (sometimes referred to as the presentation tier), 2) an application tier (sometimes referred to as the logic or business logic tier), and 3) a data tier (e.g., database tier). Such multi-tier architectures are commonly employed to implement session-based systems. That is, such multi-tier architectures often host session-based applications that comprise a plurality of transactions having explicit dependencies on each other. For example, in an e-commerce system that hosts a typical online bookstore application (e.g., session-based application), "an order" cannot be submitted to the e-commerce system unless the previous transactions have resulted in "an item being ordered". In this example, the online bookstore application is a session-based application that comprises a plurality of interdependent transactions (e.g., browsing for books, selecting book(s) to be purchased, completing payment and/or shipping information for purchasing selected book(s), etc.). The e-commerce system may be implemented as a multi-tier architecture for hosting such session-based application, wherein the multi-tier architecture may comprise an interface tier for presenting user-interactive interface to a user with which the user may interact to perform the browsing, selecting, and purchasing transactions, an application tier implementing the logic for performing the processing operations associated with each transaction, and a data tier (e.g., database tier) for performing the database operations associated with the transactions, such as for searching for books provided by the online bookstore application. As can be seen from this example, such a session-based system is not stateless since the next client transaction explicitly depends on the previous ones.

Further, since these applications are performance sensitive, effective models for dynamic resource provisioning and for delivering a desired target level of quality of service (QoS) to these applications becomes critical. Workloads in such environments (e.g., multi-tier systems) are characterized by client sessions of interdependent requests with changing transaction mix and load over time, thus making model adaptivity to the observed workload changes a desirable feature for model effectiveness.

It is very difficult to model session-based systems using analytic models. Analytic models generally do not have the ability to model the states of the session-based systems. Instead, analytic models traditionally only work well on stateless systems. For performance reasons, a technique to reduce a session-based system to a transaction-based system that can be accurately and efficiently modeled by an analytic model becomes desirable. Embodiments of the present invention provide techniques for generating and employing a simplified, stateless transaction-based model for modeling a session-based system (which is not stateless, as discussed above). As an example, in one embodiment, such transaction-based model is implemented as a closed system with a network of queues, as discussed further herein. According to certain embodiments, such stateless transaction-based model is based on the probabilistic transaction mixes observed for the session-based system being modeled and the corresponding resource costs approximated for each type of transaction.

According to one embodiment, client-access behavior information obtained for a session-based system is evaluated. For instance, such client-access behavior information may comprise a probability matrix of the transition probabilities of all the transaction types of the session-based system. From such information, a steady-state probability of each transaction type is determined in one embodiment. For instance, an overall percentage of transactions of each type of transaction may be determined. As an example, in one embodiment, a probability matrix "P" of the transition probabilities of all the transaction types of the session-based system is evaluated to determine a vector π that represents the steady-state probability for all transactions, i.e., $\pi_i$ gives the overall percentage of transactions of type i in a representative workload of the system. Such steady-state probability information provides the basis for the stateless, transactional-based model of the session-based system, according to one embodiment of the present invention.

According to certain embodiments, the transactional-based model is parameterized based on information regarding the corresponding amount of resource capacity that is consumed for servicing each transaction. That is, the transactional-based model not only represents the steady-state probability information for the transactions, but also reflects the corresponding amount of resource capacity (e.g., CPU utilization) that is expected for each of the transactions.

As described further herein, according to one embodiment of the present invention, a regression-based method is employed for approximating resource (e.g., CPU) demand of client transactions on a given hardware. Then, this approximation is used for parameterizing the transaction-based analytic model. In certain embodiments, the transaction-based analytic model is a simple network of queues, where each queue represents a tier of a multi-tier system being modeled. We provide an analysis of the approximation's effectiveness for modeling diverse workloads with a changing transaction mix over time. Also, using the well-known TPC-W benchmark and its three different transaction mixes, we investigate factors that impact the efficiency and accuracy of the proposed performance prediction models. Our experimental results described further herein show that this regression-based approach provides a simple and powerful solution for efficient capacity planning and resource provisioning of session-based applications, such as the above-mentioned multi-tier applications, under changing workload conditions.

Since service providers are generally interested in dynamic resource provisioning methods for their production systems wider live, real workloads, it becomes desirable to understand which are the most important properties of these workloads to incorporate into an analytic model to be used for managing such dynamic resource provisioning. To this end, let us consider what is required at the server side to generate a reply in response to a web page request issued by a client. Typically, a client communicates with a web service (deployed as a multi-tier application) via a web interface, where the unit of activity at the client-side corresponds to a download of a web page. In general, a web page is composed of an HTML file and several embedded objects such as images. A browser retrieves a web page by issuing a series of HTTP requests for all objects: first it retrieves the main HTML file and after parsing it, the browser retrieves all embedded images. Thus, at the server side, a web page retrieval corresponds to processing multiple smaller objects that can be retrieved either in sequence or via multiple concurrent connections. It is common that a web server and application server reside on the same hardware, and shared resources are used by the application and web servers to generate main HTML files as well as to retrieve page embedded object (e.g., this is the case for the well-known TPC-W implementation that uses PHP web-scripting/application development language (see e.g., PHP HyperText preprocessor, at URL www.php.net), and it is also common for many production systems that are built in a similar way). Additionally, the main HTML file may be built via dynamic content generation where the page content is generated on-the-fly to incorporate customized data retrieved via multiple queries from the back-end database.

Thus, in a session-based system that hosts an application that comprises a plurality of interdependent transactions, each transaction may involve use of resources for serving various objects associated with the transaction. For instance, a given transaction may involve retrieval of a corresponding web page, which as discussed above may involve processing multiple smaller objects that can be retrieved either in sequence or via multiple concurrent connections. As an example, in an e-commerce system that hosts an online bookstore application (e.g., session-based application), a first web page may be presented to enable a user to perform a first transaction, such as browsing for books, and a different web page may be presented to enable a user to perform a different transaction, such as completing payment information for purchasing selected book(s).

Accordingly, the interdependent transactions of a session-based system may comprise composite transactions. In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page), and thus the given transaction for serving the information may be considered a composite transaction as it involves various transactions for serving the objects that form such information.

Since the HTTP protocol does not provide any means to delimit the beginning or the end of a web page it is very difficult to accurately measure the aggregate resources consumed due to web page processing at the server side. There is no practical way to effectively measure the service times for all page objects, although accurate CPU consumption estimates are desired for effective model parameterization. To address this problem, embodiments of the present invention define a transaction as a combination of all the processing activities at the server side to deliver an entire web page requested by a client, i.e., generate the main HTML file as well as retrieve embedded objects, and perform related database queries. For instance, a corresponding cost for resource consumption (e.g., CPU utilization) is determined for each "composite transaction" of a session.

While it is well-accepted (see e.g., L. Cherkasova, P. Phaal, "Session Based Admission Control: a Mechanism for Peak Load Management of Commercial Web Sites", *IEEE J. Transactions on Computers*, v. 51, No. 6, 2002; and D. Krishnamurthy, J. Rolia, S. Majumdar, "A Synthetic Workload Generation Technique for Stress Testing Session-Based Systems", *IEEE Trans. Software Eng.* 32(11), 2006) that a workload of e-commerce and enterprise sites is more accurately described at the level of sessions, embodiments of the present invention provide techniques for generating and employing a simplified workload model that is based only on the probabilistic transaction mixes. The inventors of the present invention have discovered that such a simplified, transaction-based model can be used for accurate and efficient performance modeling of such session-based sites, as the exemplary case studies described further herein verify.

FIG. 1 shows an exemplary system 10 according to one embodiment of the present invention. System 10 comprises a session-based system 11 which has one or more session-based applications (or "services") that are available for access by clients. For instance, in the illustrated example, session-based system 11 comprises session-based application 108 having transactions 109A-109D that are interdependent. For instance, arrows between the transactions 109A-109D reflect their interdependency in this exemplary embodiment, wherein from transaction 109A a user may go to either of transactions 109B or 109C; from transaction 109B a user may go to either of transactions 109A or 109C; from transaction 109C a user may go to either of transactions 109A, 109B or 109D; and from transaction 109D a user may go to transaction 109C. Of course, the exemplary transaction dependencies shown in FIG. 1 for application 108 may differ for other session-based applications.

Thus, there are explicit transaction dependencies in session-based systems, e.g., "an order" cannot be submitted (e.g., in transaction 109D of exemplary application 108) to an e-commence system unless the previous transactions have resulted in "an item being ordered" (e.g., in transaction 109C of exemplary application 108). Therefore, the session-based system 11 is not stateless since the next client transaction explicitly depends on the previous ones. As mentioned above, such transaction dependency in the client behavior limits the opportunity for an efficient analytic model design. As described further hereafter, embodiments of the present invention simplify the workload such that all transaction dependencies are ignored to provide a simple, transaction-based analytic model of the session-based system.

At any given time, session-based system 11 may have a current, live workload 17 of client requests that it is servicing. In certain embodiments, an admission controller 103 may be employed to manage admission of new client requests to session-based system 11 in a manner that attempts to manage the QoS provided by session-based system 11 to the accepted client requests. Such admission controllers are well-known in the art, and are thus not described further here.

Additionally, in certain embodiments, a resource pool 101 may also be implemented comprising various computing resources that may be allocated to session-based system 11 by a resource provisioning controller 102. For example, resource pool 101 may comprise processing resources, such as central processing units (CPUs), data storage resources (e.g., hard disk, memory, peripheral data storage, etc.), I/O resources, and/or networking resources (e.g., network access ports, etc.) that may be provisioned to session-based system 11 for servicing its workload 17. In certain embodiments, resource provisioning controller 102 may dynamically provision such computing resources from pool 101 to session-based system 11 in response, for example, to changes in the demands of the workload 17 being serviced by session-based system 11. For example, in Next Generation Data Centers (NGDC), where server virtualization provides the ability to slice larger, underutilized physical servers into smaller, virtual ones, across which resources of pool 101 may be shared wherein resource provisioning controller 102 may dynamically provision the shared resources across the servers as appropriate based on workloads and QoS targets of each server.

System 10 further comprises analytic model generator 12, which is operable to generate a transaction-based analytic model 15 for modeling session-based system 11. More specifically, in certain embodiments, transaction-based analytic model 15 provides a performance model for one or more session-based applications, such as session-based application 108, provided by session-based system 11. As mentioned above, difficulty arises in modeling a session-based system. However, transaction-based analytic model 15 that is generated according to embodiments of the present invention may be advantageously employed for modeling a session-based system to provide a simple performance model of the session-based system from which analysis of the capacity of the session-based system for supporting a given workload can be accurately and efficiently determined, as discussed further herein.

As discussed further herein, in certain embodiments, transaction-based model 15 is a stateless transaction-based model for modeling session-based system 11 (which is not stateless, as discussed above). As an example, in one embodiment, such transaction-based model 15 is implemented as a closed system with a network of queues, as discussed further herein. According to certain embodiments, such stateless transaction-based model 15 is based on the probabilistic transaction mixes observed for the session-based system 11 being modeled. Once determined, transaction-based analytic model 15 may be stored to a computer-readable medium, such as memory, hard drive, peripheral data storage driver optical data storage (e.g., CD, DVD, etc.), magnetic data storage, tape storage, etc. The transaction-based analytic model 15 and/or modeling data included therein may be stored in the form of any suitable data structure, such as to a database, file, table, etc.

In certain embodiments, client-access behavior information 13 is obtained and utilized by analytic model generator 12. That is, client-access behavior information 13 is obtained for session-based system 11, and is evaluated by analytic model generator 12 for deriving transaction-based analytic model 15. Client-access behavior information 13 identifies the access behaviors of clients in accessing session-based application 108 provided by session-based system 11. For instance, such client-access behavior information 13 may comprise a probability matrix of the transition probabilities of all the transaction types (e.g., transaction types 109A-109D) of the session-based system 11. From such information, a steady-state probability of each transaction type is determined in one embodiment. For instance, an overall percentage of transactions of each type of transaction may be determined. As an example, in one embodiment, a probability matrix "P" of the transition probabilities of all the transaction types of the session-based system is evaluated to determine a vector $\pi$ that represents the steady-state probability all transactions, i.e., $\pi_i$ gives the overall percentage of transactions of type i in a representative workload 18 of the system. Such steady-state probability information provides the basis for the stateless, transactional-based model of the session-based system, according to one embodiment of the present invention.

Client-access behavior information 13 may be determined from a representative workload 18. Representative workload 18 may be an actual historical workload collected for session-based system 11 (such as a historical "live workload"), for example. That is, representative workload 18 may comprise data representing an actual historical workload collected for session-based system 11 over a given period of time, say a preceding 3-month period for example. Representative workload 18 may comprise data stored to a computer-readable medium, such as memory, hard drive, peripheral data storage drive, optical data storage (e.g., CD, DVD, etc.), magnetic data storage, tape storage, etc. Representative workload 18 may be stored in the form of any suitable data structure, such as to a database, file, table, etc. Again, in certain embodiments, such data may represent an actual historical workload of the service provider's session-based computing system 11.

The representative workload data 18 may be collected through well-known application logs and system usage metrics, such as CPU utilization measured at a defined time scale (e.g., 5 minutes or so). As one example, the data collected in access logs generated by Hewlett-Packard's Open View Service Desk (OVSD) application server may be used in forming representative workload 18. Other types of access logs, which may be customized for their respective applications, may be used for collecting a historical live workload in accordance with embodiments of the present invention. As an illustrative example, such access logs typically collect such data as the following for each transaction: date and a time stamp of the request, session ID, transaction URL, and referrer field.

In certain embodiments, the representative workload 18 may be analyzed to determine the client-access behavior information 13. For instance, analysis may be performed on the representative workload 18 to determine a corresponding probability matrix "P" of the transition probabilities of all the transaction types 109A-109D of the session-based system 11. One way to capture the navigation pattern within a session is through the *Customer Behavior Model Graph (CMBG)* (see e.g., D. Menasce and V. Almeida, "Scaling for E-Business: Technologies, Models, Performance, and Capacity Planning", Prentice Hall, 2000), which describes patterns of user behavior, i.e., how users can navigate through the site, and where arcs connecting states (transactions) reflect the probability of the next transaction type. Once determined, client-access behavior model 13 may be stored to a computer-readable medium, such as memory, hard drive, peripheral data storage drive, optical data storage (e.g., CD, DVD, etc.), magnetic data storage, tape storage, etc. The client-access behavior model 13 may be stored in the form of any suitable data structure, such as to a database, file, table, etc.

In certain embodiments, a most popular subset of the transactions of a session-based application may be determined and evaluated for deriving the transaction-based analytic model. For instance, the techniques described further in co-pending and commonly-assigned U.S. patent application Ser. No. 11/684,567 titled "SYSTEM AND METHOD FOR DETERMINING A SUBSET OF TRANSACTIONS OF A COMPUTING SYSTEM FOR USE IN DETERMINING RESOURCE COSTS" may be employed to identify a subset of the transactions of the session-based application that are to be used in the transaction-based analytic model. The subset of transactions identified may encompass the most popular transaction types, wherein transaction types that are encountered relatively rarely by the session-based application may be omitted from the subset in certain embodiments, as those rare transaction types may have little impact on the system model for performance analysis. Accordingly, in certain embodiments, once the subset is determined, in certain embodiments the performance of the session-based system may be accurately and efficiently modeled by the transaction-based model derived for such subset of transactions. For instance, the client-access behavior information 13 for such subset of transaction types and the corresponding resource costs determined for the subset of transaction types may be employed for modeling the session-based application in order to evaluate capacity of the session-based system under a given workload. Of course, in other embodiments, all transaction types of the session-based application being modeled may be included in the model.

Further, in certain embodiments, a resource cost calculator 14 is provided that is operable to determine (in operational block 110) a corresponding resource cost for each transaction 109A-109D of the session-based application 108 provided by session-based system 11. That is, resource cost calculator 14 analyzes representative workload 18 to compute a corresponding resource cost for each transaction 109A-109D of session-based application 108 that is hosted by session-based system 11. In general, the resource cost of a transaction reflects an amount of utilization of at least one resource of system 11 in serving the transaction. For example, the resource cost that is computed in certain embodiments is a CPU cost, which is reflective of an amount of CPU utilization attributable to serving the corresponding transaction. In certain embodiments, session-based system 11 may be implemented according to a multi-tier architecture, and such CPU utilization computed by resource cost calculator 14 may be a corresponding amount of CPU utilization of a given tier of multi-tier architecture that is attributable to serving the corresponding transaction. As discussed further herein, in certain embodiments, the transactions may comprise one or more composite transactions, and resource cost calculator 14 computes the corresponding resource cost for each of such composite transactions. Thus, resource cost calculator 14 may, in certain embodiments, be referred to as a composite transaction resource cost calculator ("CTRCC").

As described further herein, in certain embodiments, resource cost calculator 14 employs a regression-based solver for determining the resource cost for the transactions (e.g., composite transactions). According to certain embodiments, such a regression-based solver may determine resource costs in the manner described in co-pending and commonly assigned U.S. patent application Ser. No. 11/684,563 filed Mar. 9, 2007 titled "REGRESSION-BASED SYSTEM AND METHOD FOR DETERMINING RESOURCE COSTS FOR COMPOSITE TRANSACTIONS", the disclosure of which is incorporated herein by reference.

An exemplary statistical regression-based analysis that may be employed by such a regression-based solver of resource cost calculator 14 is described further below. According to one embodiment, the regression-based solver of resource cost calculator 14 uses statistical regression to approximate the resource cost (e.g., CPU demand) of each transaction on a given hardware. Thus, in certain embodiments, a real (live) workload mix can be directly mapped onto the corresponding computing system's resource (e.g., CPU) demand requirements for serving such workload mix.

Further, as discussed below in connection with an exemplary case study that was conducted, it is recognized that accuracy of the resource cost approximation may be impacted by the transaction mix of the representative workload 18. For instance, if an insufficient sampling of a given transaction type is present in the representative workload 18, the accuracy of the resource cost approximation may be negatively impacted. When a session-based system's workload mix changes over time, then a sampling of all of the various workload mixes may be considered in deriving the resource costs. For instance, a system may experience, at different times, transaction mixes corresponding to the "browsing", "shopping" and "ordering" transaction mixes defined by the TPC-W specification. As discussed in connection with the exemplary case study further below, a regression based analysis for approximating resource costs for each transaction type derived from an aggregate profile with all the various transaction mix types (e.g., the "browsing", "shopping", and "ordering" transaction mix types) that are encountered by the session-based system being modeled leads to improved accuracy in the model.

As discussed further below, according to certain embodiments of the present invention, analytic model generator 12 determines, in operational block 104, a transaction-based model from evaluation of client-access behavior information 13. That is, a transaction-based representation of the session-based application 108 provided by system 11 is determined in block 104 from client-access behavior information 13. As an example, in one embodiment, client-access behavior information 13 provides a probability matrix "P" of the transition probabilities of all the transaction types 109A-109D of the session-based system 11, and analytic model generator 12 analyzes, in block 104, such probability matrix "P" to determine a vector $\pi$ that represents the steady-state probability for all of transactions 109A-109D of session-based application 108, i.e., $\pi_i$ gives the overall percentage of transactions of type i (e.g., transactions 109A) in a representative workload 18 of the system. Such steady-state probability information determined in block 104 provides the basis for the stateless, transactional-based model 15 of the session-based system 11, according to one embodiment of the present invention. In one embodiment, the transactional-based model is a closed system of a network of queues. For instance, each queue may represent a corresponding tier of a multi-tier system being modeled.

According to certain embodiments, the transactional-based model determined in block 104 is then parameterized based on information regarding the corresponding amount of resource capacity that is consumed for servicing each transaction. That is, the resource cost information determined by resource cost calculator 14 is utilized for parameterizing the transactional-based model. Accordingly, the resulting transactional-based model 15 not only represents the steady-state probability information for the transactions 109A-109D, but also reflects the corresponding amount of resource capacity (e.g., CPU utilization) that is expected to be consumed for servicing each of the transaction types.

Thus, according to certain embodiments of the present invention, analytic model generator 12 determines, in operational block 105, parameters of the transaction-based model based on the determined transaction resource costs computed by resource cost calculator 14. That is, analytic model generator 12 parameterizes the transaction-based model based on the respective transaction resource costs determined for each of the transactions. As mentioned above, in certain embodiments, resource calculator 14 employs a regression-based method for approximating resource (e.g., CPU) demand of client transactions on a given hardware. Then, this approximation is used by analytic model generator 12 (in block 105) for parameterizing the transaction-based analytic model. The resulting parameterized transaction-based model is provided as transaction-based analytic model 15, which as discussed further herein may be employed for performing capacity analysis for the session-based system 11 that it models. The resulting transaction-based analytic model is stateless, but provides an efficient and accurate model of session-based system 11 (which is not stateless, i.e., is "stateful").

In certain embodiments, a workload profiler may periodically receive a representative workload 18 for a service provider and determine therefrom the client-access behavior information 13 (for at least the most popular transactions contained within the representative workload 18); and resource cost calculator 14 may receive at least the determined most popular transactions of representative workload 18 to determine the resource costs for such transactions. For instance, representative workload 18 may, in some embodiments, be a historical workload encountered by the service provider's session-based system 11 (e.g., over the preceding 3-month period), and the corresponding client-access behavior information 13 and/or transaction resource costs may be determined and analyzed by analytic model generator 12 to periodically determine an updated transaction-based analytic model 15 (or at least updated parameters 105 of such model 15). Thus, certain embodiments of the present invention may provide an updated analysis over time as the number of clients supported by the service provider and/or the client activities may change over time.

Exemplary system 10 further comprises capacity analyzer 16, which may employ the determined transaction-based analytic model 15 for performing capacity analysis of the session-based computing system 11 under a given workload, such as live workload 17 and/or a synthetic workload that may be used for capacity planning analysis. Thus, in certain embodiments, capacity analyzer 16 may be employed for performing capacity planning analysis 106 for session-based system 11. For example, in certain embodiments the capacity analyzer 16 may be employed to evaluate, based at least in part on determined transaction-based analytic model 15, the capacity of the session-based computing system 11 for serving an increased population of clients that act similar to the system's current population of clients (e.g., having similar client-access behaviors as defined in behavior information 13), etc.

In certain embodiments, capacity analyzer 16 may be employed for performing dynamic resource provisioning 107. For instance, live workload 17 of session-based system 11 may be monitored by capacity analyzer 16 (employing transaction-based analytic model 15) to perform dynamic resource provisioning 107, such as may be used by resource provisioning controller 102 to determine resources of resource pool 101 to allocate/de-allocate to session-based system 11 for supporting its live workload 17 in accordance with a pre-defined quality of service target. Additionally or alternatively, such capacity analysis of capacity analyzer 16 may be used by an admission controller 103 to determine whether to admit further client requests for service to session-based system 11 to ensure that session-based system 11 provides a pre-defined quality of service target for admitted requests.

In certain embodiments, capacity analyzer 110 uses an analytic model 111 for capacity planning of multi-tier applications hosted by computing system 115 with session-based workloads, as discussed further herein. Such an analytic model 111 may be based on a network of queues, where the queues represent different tiers of the application. As such, in certain embodiments, the capacity of each tier of a multi-tier application hosted by computing system 115 may be determined by capacity analyzer 110.

Analytic model generator 12, resource cost calculator 14, capacity analyzer 16, as well as resource provisioning controller 102 and/or admission controller 103 may be implemented as computer logic, such as computer hardware, software, firmware, and/or a combination thereof. For instance, in certain embodiments, these elements are implemented as computer-executable software code stored to a computer-readable medium and/or as hardware logic, as examples.

FIG. 2 shows an exemplary system according to one embodiment for generating a transaction-based analytic model 15. In this example, client-access behavior information 13 is provided for a session-based application that comprises various transaction types 21A-21D. In this example, the client-access behavior information 13 describes the navigation pattern within the session-based application (e.g., as with a CMBG), wherein arcs connecting states (transaction types) reflect the corresponding probability of the next transaction type. For instance, in the illustrated example, the session-based application corresponds to a web service provided by an e-commerce site, which enables users to place an order through the web site by performing such transactions as selecting a product (transaction type 21A), providing shipping information (transaction type 21B), arranging payment agreement (transaction type 21C), and finally receiving a confirmation (transaction type 21D). In this illustrated example, the connecting arcs indicate that typical client behavior involves: a 20% probability that a client conducting transaction 21A (selecting a product) will conduct transaction 21B (providing shipping information); an 8% probability that a client conducting transaction 21B (providing shipping information) will return to transaction 21A (selecting a product) and a 60% probability that such a client conducting transaction 21B (providing shipping information) will advance to transaction 21C (arranging payment agreement); a 10% probability that a client conducting transaction 21C (arranging payment agreement) will return to transaction 21A (selecting a product), a 10% probability that such a client conducting transaction 21C (arranging payment agreement) will return to transaction 21B (providing shipping information), and a 80% probability that a client conduction transaction 21C (arranging payment agreement) will advance to transaction 21D (receiving a confirmation).

Thus, for a customer trying to place an order, or a retailer trying to make a sale, the real performance measure of this web service is its ability to process the entire sequence of individual transactions that are needed to complete a higher-level business transaction (e.g., the performance of transactions 21A-21D for completing a user's shopping experience). The capacity of the system may therefore measured by the number of such concurrent client sessions that the system (e.g., a multi-tier system) can support without violating pre-defined limits in average transaction response times. Therefore, the workload of e-commerce and enterprise sites is best described at the level of sessions.

As described above, analytic model generator 12 receives the client-access behavior information 13, and, in block 104, determines a stateless transaction-based model therefrom. For instance, analytic model generator 12 may analyze, in block 104, the access probability information contained in client-access behavior information 13 (e.g., a probability matrix "P") to determine a vector $\pi$ that represents the steady-state probability for all of transactions 21A-21D, i.e., $\pi_i$ gives the overall percentage of transactions of type i (e.g., transactions 21A). As shown in this example, analytic model generator 12 may determine a model 201 comprising a network of queues based on the determined steady-state probability of each transaction occurrence.

Further, as discussed above with FIG. 1, resource cost analyzer 14 may employ a regression-based analysis on a representative workload 18 to determine corresponding resource costs for each of the transaction types 21A-21D. And, analytic model generator 12 utilizes such determined resource costs in block 105 to parameterize the determined network of queues 201, thereby resulting in the stateless, transaction-based analytic model 15 of the session-based system.

FIG. 3 shows an exemplary operational flow diagram according to one embodiment of the present invention. In operational block 31, a transaction-based analytic model 15 is generated to model a session-based system 11. Such transaction-based analytic model 15 may be generated in the manner described above by analytic model generator 12. Further, in operational block 32, the generated transaction-based analytic model is utilized (e.g., by capacity analyzer 16 of FIG. 1) for evaluating capacity of the session-based system 11 for supporting a workload. Such capacity evaluation may be evaluation of a current, live workload 17 (or recently encountered workload of session-based system 11) for performance of dynamic provisioning of resources (e.g., of resource pool 101) to the session-based system 11. Additionally or alternatively, such capacity evaluation may be evaluation of synthetic workloads expected (e.g., predicted based on projected workload growth) to be encountered in the future by session-based system 11 for performance of capacity planning for session-based system 1.

FIG. 4 shows an exemplary operational flow diagram for analytic model generator 12 according to one embodiment of the present invention. In operational block 41, analytic model generator 12 receives client-access behavior information 13 for a session-based system 11 that comprises a plurality of interdependent transaction types (e.g., transaction types 109A-109D of FIG. 1 or transaction types 21A-21D of FIG. 2). In certain embodiments, such client-access behavior information 13 comprises a probability matrix "P" of the transition probabilities of all the transaction types of the session-based system, as shown in optional sub-block 401.

In operational block 42, analytic model generator 12 derives, from the received client-access behavior information 13, a stateless transaction-based model of the session-based system 11. For instance, in one embodiment such transaction-based model is determined as shown in optional sub-blocks 402-403. In sub-block 402, the analytic model generator 12 determines, from a probability matrix "P" (of the client-access behavior information 13), a vector $\pi$ that represents the steady-state probability for all of the transactions of the session-based system. In sub-block 403, the analytic model generator 12 determines a closed system of a network of queues based on the determined steady-state probability for all of the transaction types. As shown in optional sub-block 404, in certain embodiments each queue corresponds to one of the plurality of transaction types (e.g., transaction types 109A-109D of FIG. 1 or transaction types 21A-21D of FIG. 2). As shown in optional sub-block 405, in certain embodiments each queue corresponds to one of a plurality of tiers in a multi-tier system employed by the session-based system 11 being modeled.

In operational block 43, analytic model generator 12 determines a corresponding resource cost for each of the transaction types of the session-based system being modeled. As discussed further herein such corresponding resource costs may be determined in the manner shown in optional sub-blocks 406-407. For instance, in sub-block 406, a resource cost calculator 14 receives a representative workload 18 of the session-based system 11, and in sub-block 407, the resource cost calculator 14 employs a regression-based analysis for approximating the corresponding resource cost for each of the transaction types. In operational block 44, analytic model generator 12 parameterizes the transaction-based model (e.g., the closed system of a network of queues) based on the determined resource costs of the transaction types.

In certain embodiments, the determined transaction-based model 15 may be employed in a capacity analysis system, such as that described further in co-pending and commonly-assigned U.S. patent application Ser. No. 11/684,569 filed Mar. 9, 2007 titled "SYSTEM AND METHOD FOR CAPACITY PLANNING FOR COMPUTING SYSTEMS", the disclosure of which is incorporated herein by reference. For instance, the determined transaction-based model 15 that is derived in accordance with embodiments of the present invention may be employed as the analytic model 111 in the capacity planning framework of U.S. patent application Ser. No. 11/684,569 titled "SYSTEM AND METHOD FOR CAPACITY PLANNING FOR COMPUTING SYSTEMS" for analysis for a session-based system.

Exemplary techniques that may be employed for embodiments of the present invention as well as exemplary experimental results for implementations of embodiments of the present invention are described below. Of course, it should be recognized that the specific exemplary experiments described below are intended merely for illustrative purposes and are not intended to be limiting on the scope of the concepts presented herein.

As used herein, systems that do not have inter-request dependencies are referred to as transaction-based systems. According to certain embodiments of the present invention, the inventors answer the question of whether resource requirements of a session-based system can be modeled well by evaluating the resource requirements of a simplified transaction-based model of the session-based system. As discussed further herein, through application of concepts presented herein, the question is answered affirmatively. That is, techniques are presented herein for deriving such a simplified transaction-based model of a session-based system which enables resource requirements of a session-based system to be effectively modeled.

For description of one exemplary embodiment, let us assume that there is a total of N transaction types processed by the session-based system that is to be modeled. We use the following notation:

let $p_{i,j}$ be the probability of the transaction type i following the transaction type j in the same client session, where $1 \leq i$, $j \leq N$;

let P be the probability matrix of the transition probabilities of all the transaction types, i.e., $$p = \begin{bmatrix} p_{1,1} & p_{1,2} & \cdots & p_{1,N-1} & p_{1,N} \\ p_{2,1} & p_{2,2} & \cdots & p_{2,N-1} & p_{2,N} \\ \cdots & & & & \\ p_{N-1,1} & p_{N-1,2} & \cdots & p_{N-1,N-1} & p_{N-1,N} \\ p_{N,1} & p_{N,2} & \cdots & p_{N,N-1} & p_{N,N} \end{bmatrix} \quad (1)$$

let $\pi = [\pi_1, \pi_2, \ldots, \pi_N]$ be the vector of stationary probabilities of the transactions, i.e., if $\pi P = \pi$ and $\pi e = 1$, where e is a column vector of 1s with the appropriate dimension. Thus, vector π represents the steady-state probability for all transactions, i.e., $\pi_i$ gives the overall percentage of transactions of type i in the workload.

In order to compare performance of session-based versus transaction-based system, we designed and implemented a simulation model (which may be implemented using C++Sim) of session-based system and its transaction-based equivalent as follows:

session-based model: we simulate the real session behavior of each client. The transaction type is determined when a client sends out the request to the system (according to the pre-defined transition probability matrix P), and this transaction type generates the appropriate sequence of requests to the other tiers in the modeled multi-tier system. The next client transaction in the session is generated according to the transaction probability matrix P.

transaction-based model: each tier has the same transaction mix as the session-based system. However, the transaction type in each tier is selected according to the stationary probabilities π.

In our experiments, we use a testbed of a multi-tier application using the three-tier architecture paradigm that has become the industry standard for implementing scalable client-server applications. This allows to conduct experiments under different settings in a controlled environment, which then allows to evaluate the proposed modeling approach.

In our experiments, we use a testbed of a multi-tier e-commerce site that simulates the operation of an online bookstore, according to the classic TPC-W benchmark. A high-level overview of the experimental set-up is illustrated in FIG. 5 as system 500 which comprises a number of clients 501 interacting with front server 502 (e.g., via HTTP requests), which may in-turn interact with database server 503 (e.g., via SQL requests). Specifics of the software/hardware used in the testbed for this exemplary experiment are given in Table 1 below.

TABLE 1

|  | Processor | RAM |
|---|---|---|
| Clients (Emulated-Browsers) | Pentium III/1 GHz | 2 GB |
| Front Server - Apache 2.0/Tomcat 4.0 | Pentium III/1 GHz | 3 GB |
| Database Server - MySQL 4.0 | Pentium III/1 GHz | 3 GB |

According to the TPC-W specification, the number of concurrent sessions (i.e., customers) or emulated browsers (EBs) 501 is kept constant throughout the experiment. For each EB, the TPC-W benchmark statistically defines the user session length, the user think time, and the queries that are generated by the session. To better simulate the behavior of a real system, there is a time-out period (uniformly distributed between 5 and 15 minutes) that is associated with each EB. If a time-out occurs, then the session ends and a new session starts immediately. The database size is determined by the number of items and the number of customers 501. In the exemplary experiments described herein, we use the default database setting, i.e., the one with 10,000 items and 1,440,000 customers.

TPC-W defines 14 different transactions which are roughly classified as either of browsing or ordering types as shown in Table 2 below.

TABLE 2

| Browsing Type | Ordering Type |
|---|---|
| Home | Shopping Cart |
| New Products | Customer Registration |
| Best Sellers | Buy Request |
| Product Detail | Buy Confirm |
| Search Request | Order Inquiry |
| Search Results | Order Display |
|  | Admin Request |
|  | Admin Confirm |

One way to capture the navigation pattern within a session is through the Customer Behavior Model Graph (CMBG), which describes patterns of user behavior, i.e., how users can navigate through the site, and where arcs connecting states (transactions) reflect the probability of the next transaction type. TPC-W defines the set of probabilities that drive user behavior from one state to another at the user session level.

According to the weight of each type of activity in a given traffic mix, TPC-W defines 3 types of traffic mixes as follows:
the browsing mix: 95% browsing and 5% ordering;
the shopping mix: 80% browsing and 20% ordering;
the ordering mix: 50% browsing and 50% ordering.

Table 3 below gives the 5 most popular transaction types of each workload mix.

TABLE 3

| Browsing Mix | Shopping Mix | Ordering Mix |
|---|---|---|
| Home 29% | Search Request 20% | Search Request 15% |
| Product Detail 21% | Product Detail 17% | Shopping Cart 14% |
| Search Request 12% | Search Results 17% | Search Results 13% |
| New Products 11% | Home 16% | Customer Registration 13% |
| Best Sellers 11% | Shopping Cart 12% | Buy Request 13% |

Thus, table 3 provides an illustrative example of different $\pi_i$ for different transaction mixes in a workload from which the behavior information is derived.

Figure 6A:
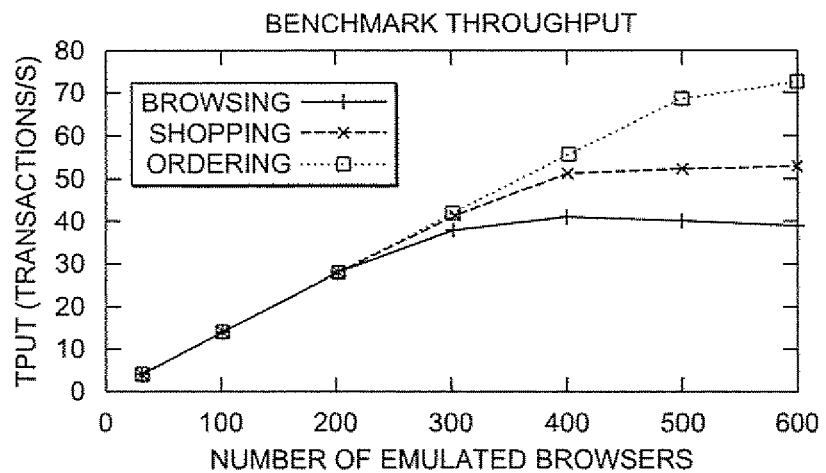
FIGS. 6A-6C show graphs presenting three TPC-W transaction mixes (i.e., referred to as browsing, shopping, and ordering mixes) showing throughput, average CPU utilization of the front server of the exemplary test-bed, and average CPU utilization of the database server of the exemplary test-bed according to an exemplary case study.
Figure 6B:
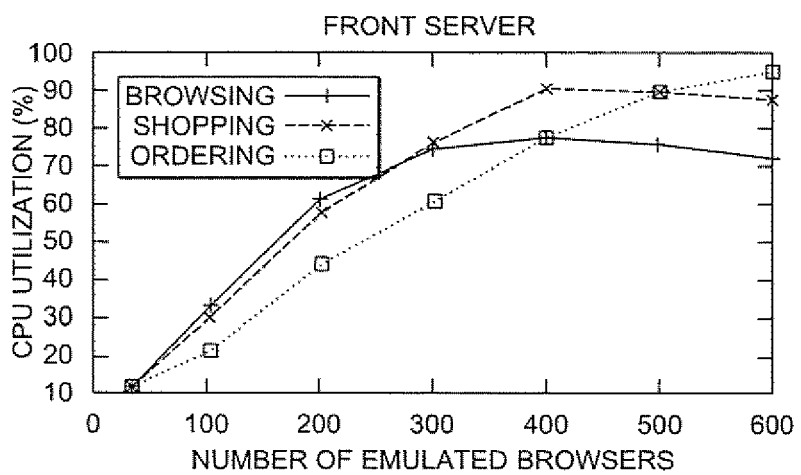
Figure 6C:
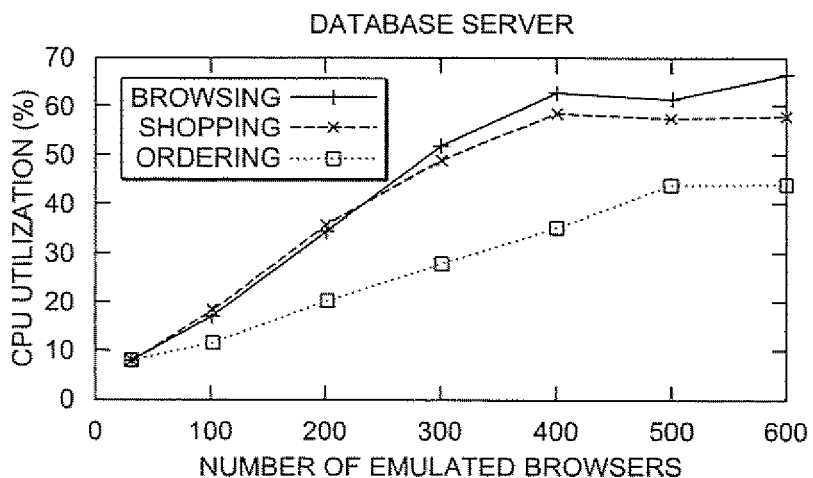

For each workload mix, we ran a set of experiments with the number of EBs equal to 30, 100, 200, 300, 400, 500, and 600 respectively. Each experiment ran for 5 hours. The first 20 minutes and the last 20 minutes are considered as warm-up and cool-down periods, thus omitted in our analysis. FIGS. 6A-6C present graphs illustrating a summary of these experiments. FIG. 6A shows that the system becomes overloaded with 300 EBs, 400 EBs, and 500 EBs under the browsing mix, shopping mix and ordering mix, respectively. System throughput asymptotically flattens with higher EBs due to the effect of a closed-loop system, i.e., there is a constant number of EBs (customers) that circulate in the system at all times. FIGS. 6B and 6C show the average CPU utilization at front and database servers respectively under the three workloads. From these results it is apparent that the front server is a bottleneck in this example when the system is processing shopping and ordering transaction mixes (CPU utilization of the front tier is reaching 90-98%, while CPU utilization of the database tier is under 40-60%). However, for the browsing mix under high loads it is not clear which tier and resource is responsible for the bottleneck: the average CPU utilization of the front and database tiers reaches 65-70%. It is not uncommon, especially under bursty workload conditions (see e.g., Qi Zhang, "The Effect of Workload Dependence in Systems: Experimental Evaluation, Analytic Models, and Policy Development", *PhD Thesis College of William and Mary*, December 2006), for the system to become overloaded. Here, average utilizations of both front and database servers are within the 65-80% range and additional performance measurements show that I/O (either at the disk or network) is not the system bottleneck either.

Figure 7:
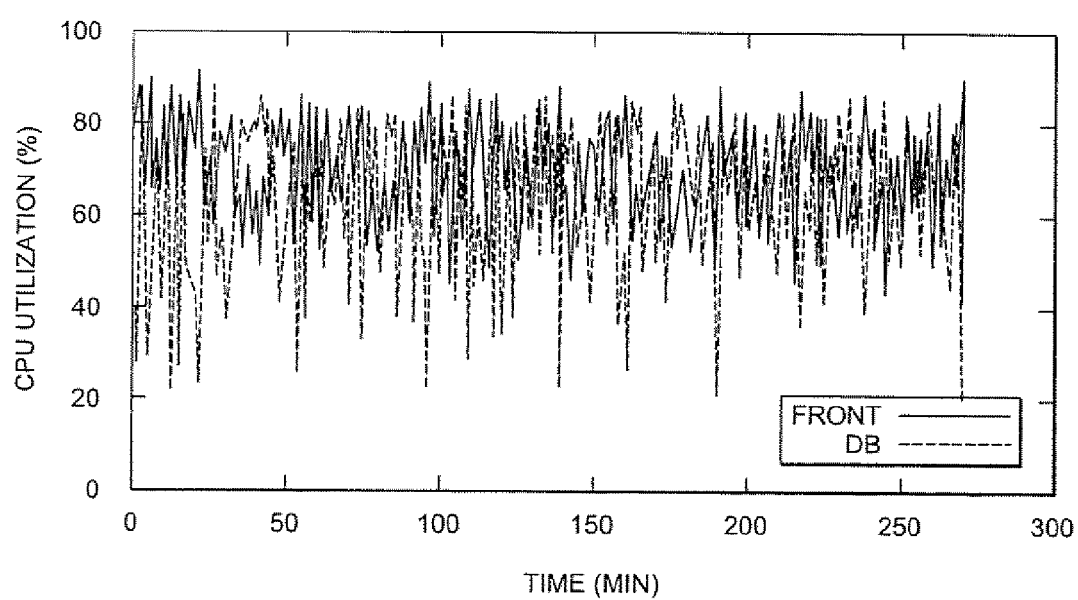
FIG. 7 shows a graph illustrating utilization of the front and database servers of the test-bed at 1-minute granularity while processing a browsing transaction mix under high load according to this exemplary case study.
Figure 8A:
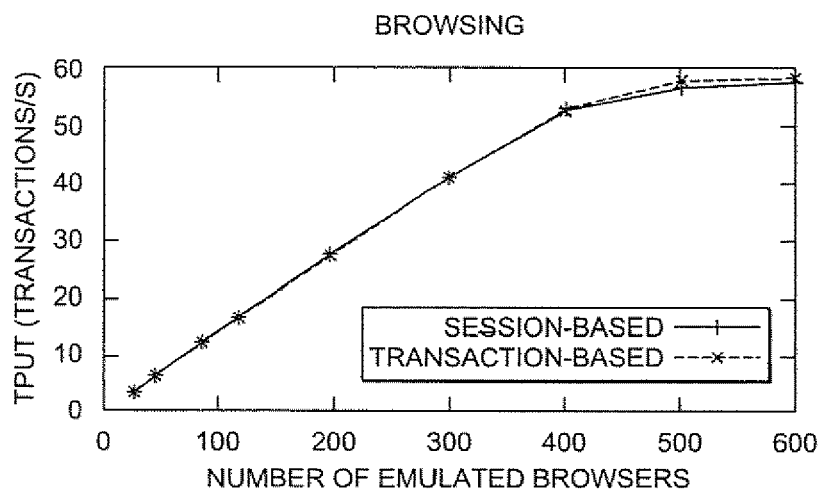
FIGS. 8A-8C show graphs illustrating throughput under the three TPC-W transaction mixes, respectively, for session-based versus transaction-based model according to this exemplary case study.
Figure 8B:
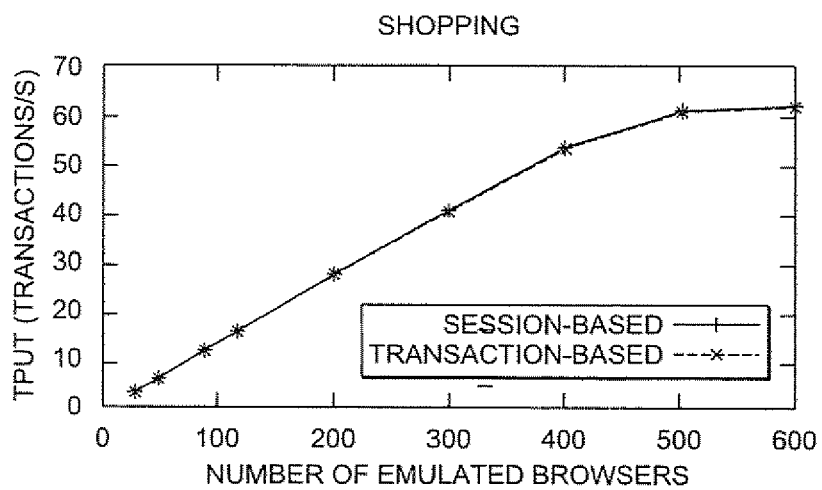
Figure 8C:
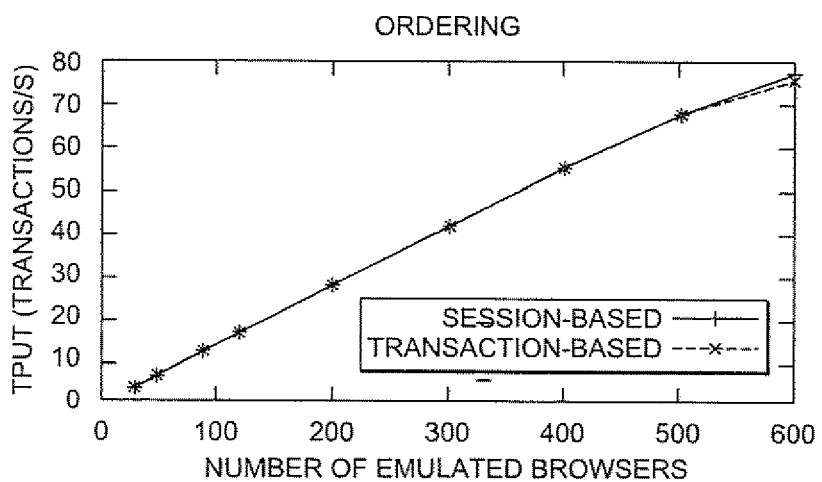
Figure 9A:
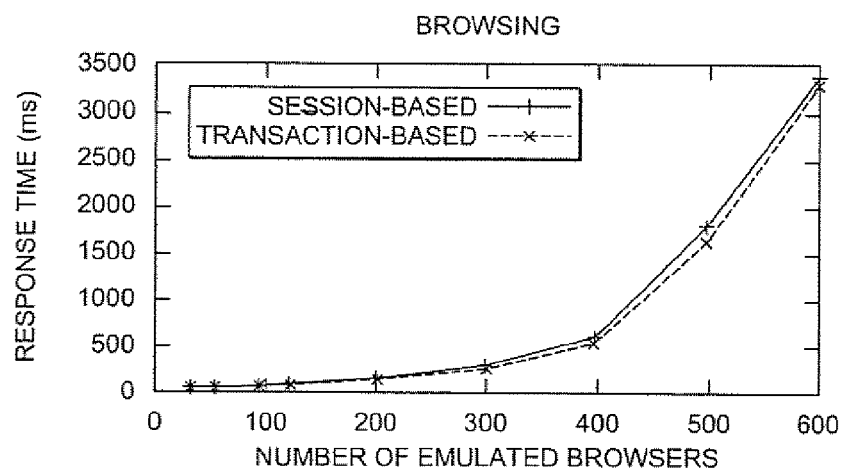
FIGS. 9A-9C show graphs illustrating average response time under the three TPC-W transaction mixes, respectively, for session-based versus transaction-based model according to this exemplary case study.
Figure 9B:
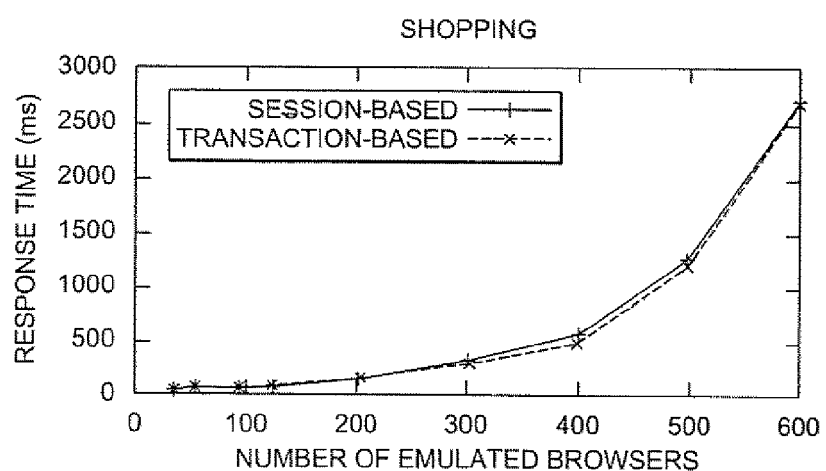
Figure 9C:
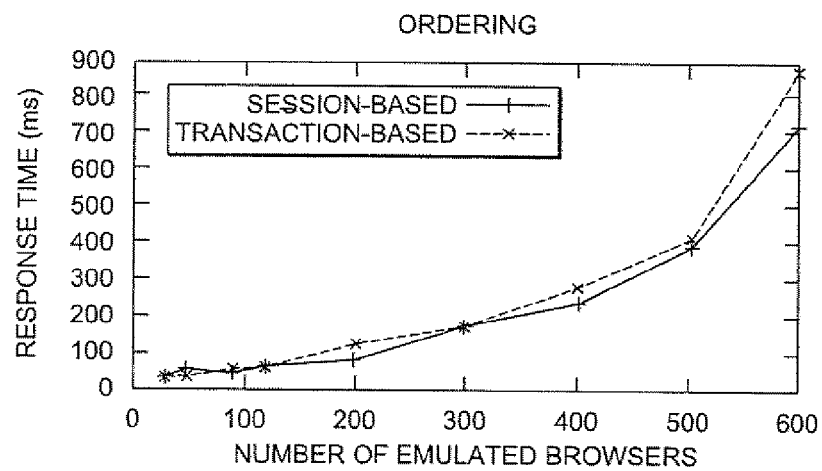
Figure 10A:
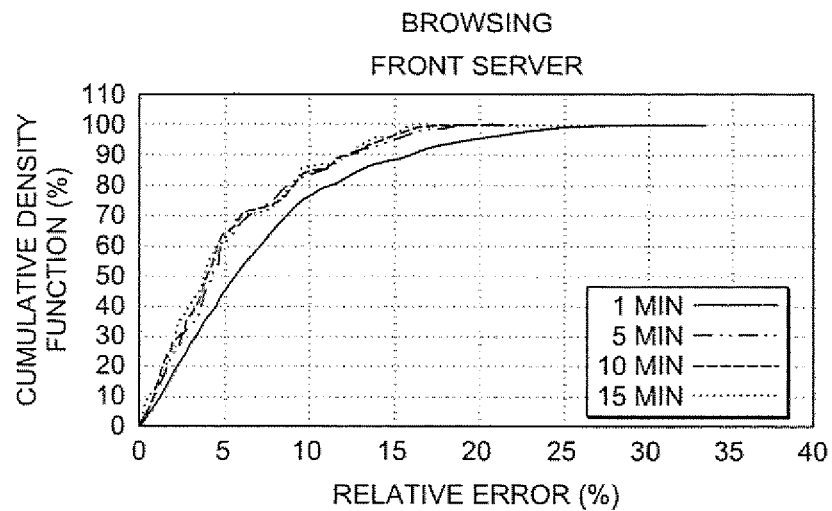
FIGS. 10A-10C show graphs illustrating CDF of relative error of regression results under different monitoring window sizes for the front server of the test-bed under the three TPC-W transaction mixes, respectively, according to this exemplary case study.
Figure 10B:
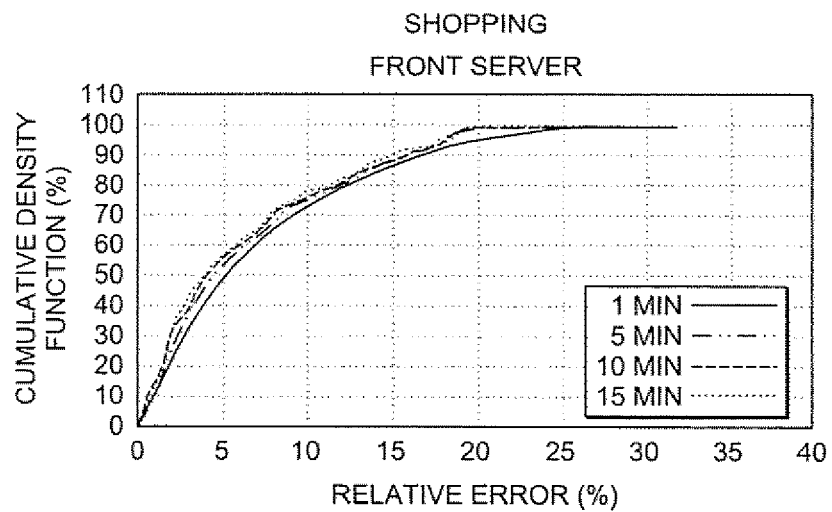
Figure 10C:
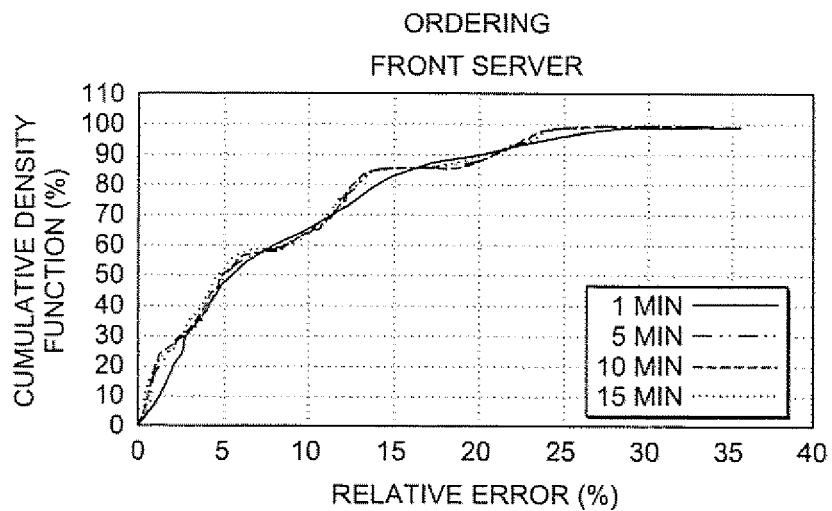

FIG. 7 shows a graph illustrating the CPU utilization of the front and database servers in this exemplary case study across time (at 1 min granularity) for the browsing mix with 400 EBs. The figure shows that there is a continuous bottleneck switch between the front and database servers over time. If switching of bottlenecks occurs across time, one can observe increased client response times and violations of service level agreements, while server utilizations on individual components remain modest. This non-stable behavior is difficult to model. Traditional analytic and simulation models assume that system is capable of higher throughput. This phenomenon is further discussed below with our modeling results.

For performance comparison we use the browsing, shopping and ordering workloads in TPC-W as defined above. FIGS. 8A-8C and 9A-9C show graphs presenting the simulation results for these workloads modeled as session-based versus transaction-based systems. FIGS. 8A-8C and 9A-9C show graphs illustrating system throughput and average transaction response time, respectively, for the three workload mixes under this exemplary case study. Simulation results confirm that performance and resource requirements of session-based systems in multi-tier environment can be efficiently modeled by their simplified transaction-based equivalent.

Under the transaction-based workload, each transaction arriving in the system is totally independent of other transactions while the overall transaction distribution is the same as in the system with session-based behavior. Such transaction distribution can be easily monitored for an existing production system. If the service time of each transaction type in the workload can be approximated (e.g., by employing the below-described regression-based analysis), then we can evaluate the average service time for the entire system under changing workload conditions (i.e., under varying transaction mix and load conditions over time) and design compact and efficient analytic models answering capacity planning and resource requirement questions.

As mentioned above, in certain embodiments, a statistical regression-based approach is employed for an efficient approximation of CPU demands of different transaction types. An example of such regression-based approach that may be employed in certain embodiments is described further hereafter.

With the knowledge of CPU demands of transactions one can easily compose the resource requirement of scaled or modified transaction mixes. Thus, the methodology described herein can be directly applied to production systems operating under live, real workloads, and can be used for explaining large-scale system behavior and predicting future system performance.

For applying the exemplary regression analysis described below, it is presumed that a service provider collects the following:

the application server access log that reflects all processed client transactions (i.e., client web page accesses); and the CPU utilization of every tier of the evaluated system.

To capture the site behavior across time, we observe a number of different transactions over monitoring windows of fixed length T. The transaction mix and system utilization are recorded at the end of each monitoring window.

Assuming that there are totally N transaction types processed by the server, we use the following notation:

T is the length of t-e monitoring window;

$N_i$ is the number of transactions of the i-th type, where $1 \leq i \leq N$;

$U_{CPU,n}$ is the average CPU utilization at n-tier during this monitoring window; and $D_{i,n}$ is the average service time of transactions of the i-th type at the n-tier of the system, where $1 \leq i \leq N$. According to this exemplary approach, this value is defined for all transactions and for all tiers. If there is no processing activity for transaction i at n-tier, then $D_{i,n}=0$.

From the utilization law, one can easily obtain Eq. (2) for each monitoring window.

$$\sum_i N_i \cdot D_{i,n} = U_{CPU,n} \cdot T. \quad (2)$$

Because it is practically infeasible to get accurate service times $D_{i,n}$, let $C_{i,n}$ denote the approximated CPU cost of $D_{i,n}$ for $0 \leq i \leq N$. Then, an approximated utilization $U_{CPU,n}'$ can be calculated as:

$$U'_{CPU,n} = \frac{\sum_i N_i \cdot C_{i,n}}{T} \quad (3)$$

To solve for $C_{i,n}$, one can choose a regression method from a variety of known methods in the art. A typical objective for a regression method is to minimize either the absolute error:

$$\sum_j |U'_{CPU,n} - U_{CPU,n}|_j,$$

or the squared error:

$$sum_j (U'_{CPU,n} - U_{CPU,n})^2_j,$$

where j is the index of the monitoring window over time.

Finding the ideal regression method for the above problem is outside of the scope of this application, and therefore is not described further herein. In all experiments, we use the Non-negative Least Squares Regression on-negative LSQ) provided by MATLAB to obtain $C_{i,n}$. This non-negative LSQ regression minimizes the error $$\varepsilon = \sqrt{\sum_j (U'_{CPU,n} - U_{CPU,n})_j^2}$$

such that $C_{i,n} \geq 0$.

This regression solver produces a solution for 200 equations with 14 variables in only 7 milliseconds. In general, the common least squares algorithms have polynomial time complexity as $O(u^3 v)$ when solving v equations with u variables, and hence, can be efficiently used as a part of on-line resource evaluation method (see e.g., B. Ari and H. A. Güvenir, "Clustered Linear Regression", *Knowledge-Based Systems*, v. 15, No. 3, 2002).

In the below discussion, we explore the impact of monitoring window size and workload rates on the accuracy of the regression solution. We use the traces collected from the TPC-W experiments under the three workload mixes (i.e., browsing, shopping, and ordering mixes as described above) to validate the accuracy of the proposed regression-based method.

In this exemplary case study, every minute we monitor and record the following:

the average CPU utilization $U_{CPU,n}$ each n-tier in the system, and the number $N_i$ of processed transactions of the i-th transaction type in the total 14 unique transaction types.

We then examine the sensitivity of the regression results to the length T of the monitoring window, i.e., T equal to 1 minute, 5 minutes, 10 minutes, and 15 minutes.

Using the aggregated values of $N_1$ to $N_{14}$ and $U_{CPU,n}$ for each monitoring window T we obtain a set of equations in a form of Eq. (2) above to approximate the CPU processing cost of transaction i at the n-tier, i.e., the front-tier and db-tier in this exemplary case study. Then, using non-negative LSQ, we solve this set of equations $C_{i,n}$ ($1 \leq i \leq 14$) in order to estimate an approximation of the CPU processing cost of all transaction types across all tiers. After this step, the approximated $U'_{CPU,n}$ (we call it fitted) of every monitoring window is computed by using the original $N_1$ to $N_{14}$ and the computed $C_{1,n}$ to $C_{14,n}$ values.

We use the relative error of the approximated CPU utilization with respect to the originally measured CPU utilization as a metric to validate the regression accuracy. For every monitoring window, the relative error of the approximated utilization is defined as $$Error_R = \frac{|U'_{CPU,n} - U_{CPU,n}|}{U_{CPU,n}} \quad (4)$$

Figure 11A:
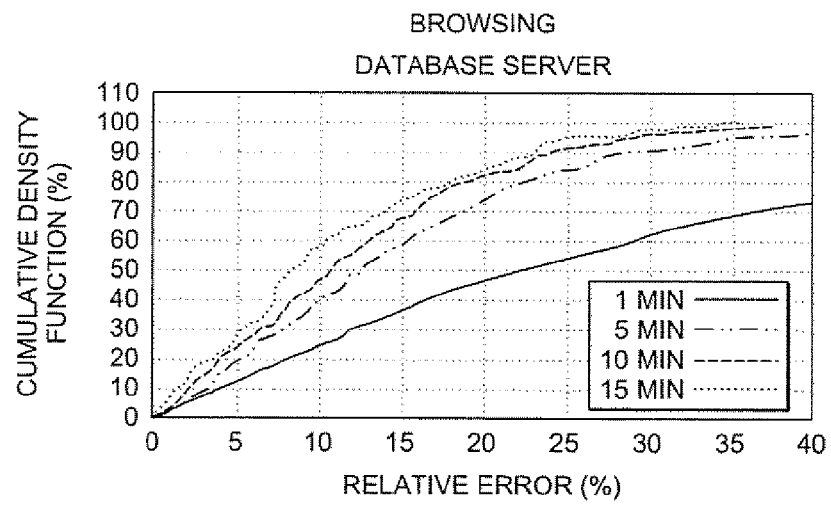
FIGS. 11A-11C show graphs illustrating CDF of relative error of regression results under different monitoring window sizes for the database server of the test-bed under the three TPC-W transaction mixes, respectively, according to this exemplary case study.
Figure 11B:
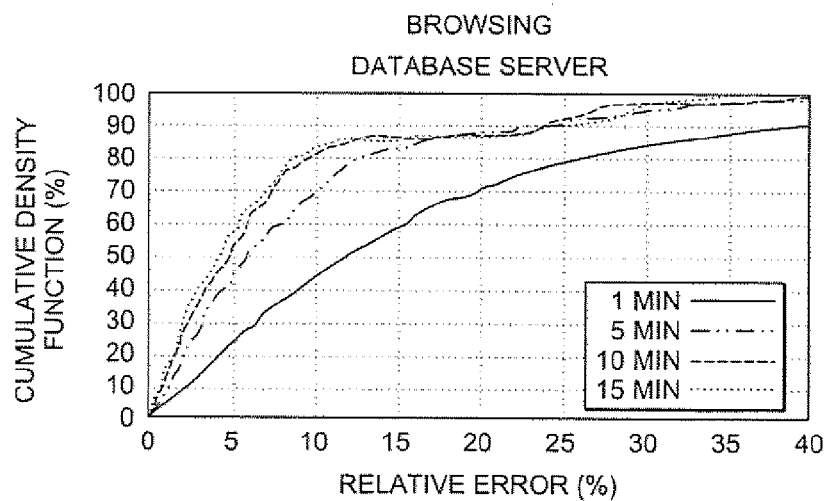
Figure 11C:
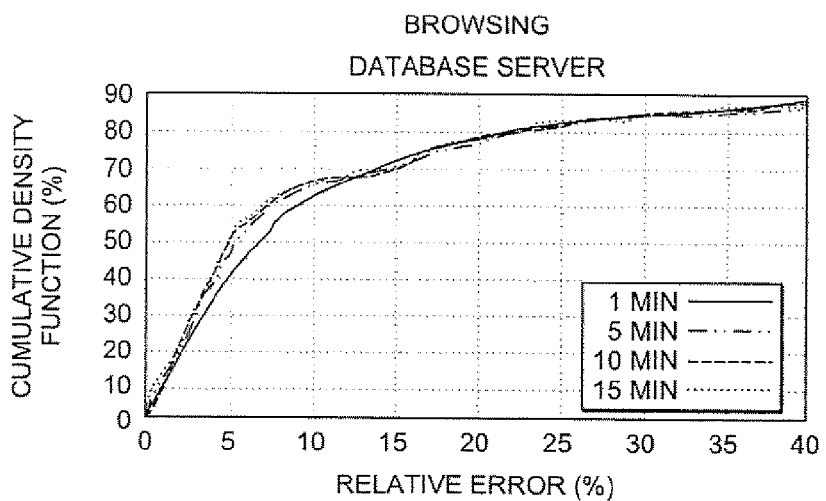
Figure 12A:
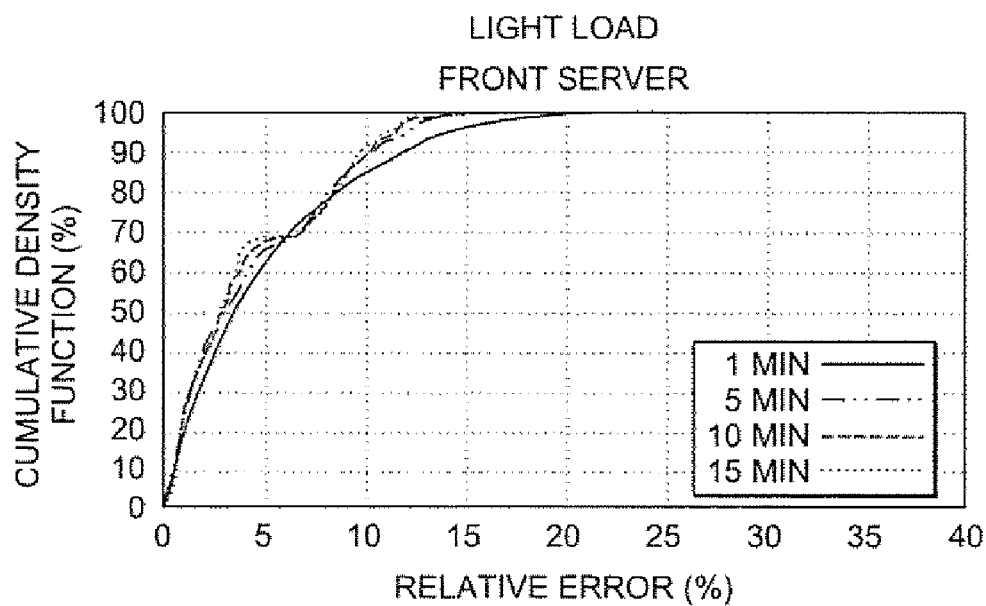
FIGS. 12A-12B show graphs illustrating CDF of relative error of regression results under light and steady loads, respectively, for the front server of the test-bed according to this exemplary case study.
Figure 12B:
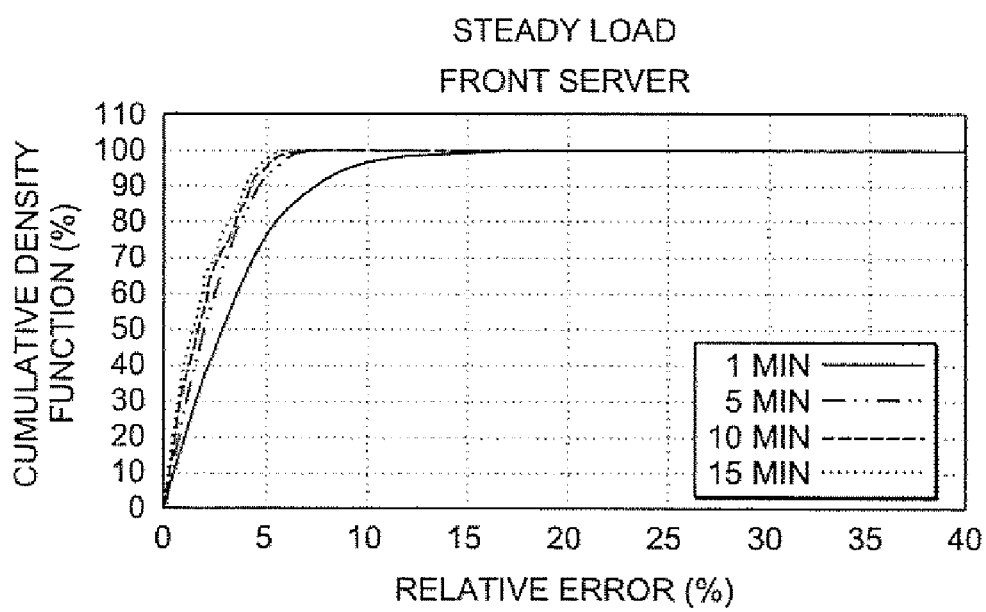
Figure 13A:
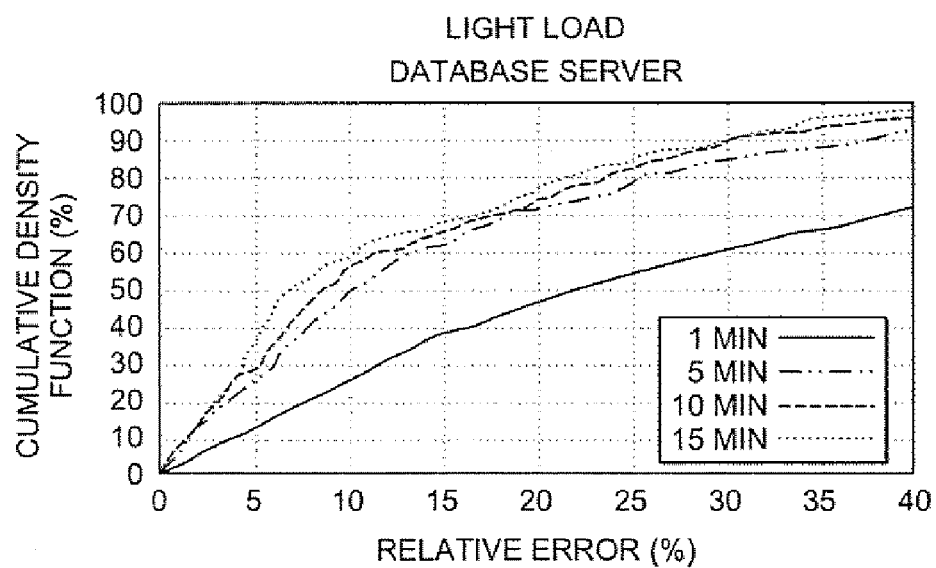
FIGS. 13A-13B show graphs illustrating CDF of relative error of regression results under light and steady loads, respectively, for the database server of the test-bed according to this exemplary case study.
Figure 13B:
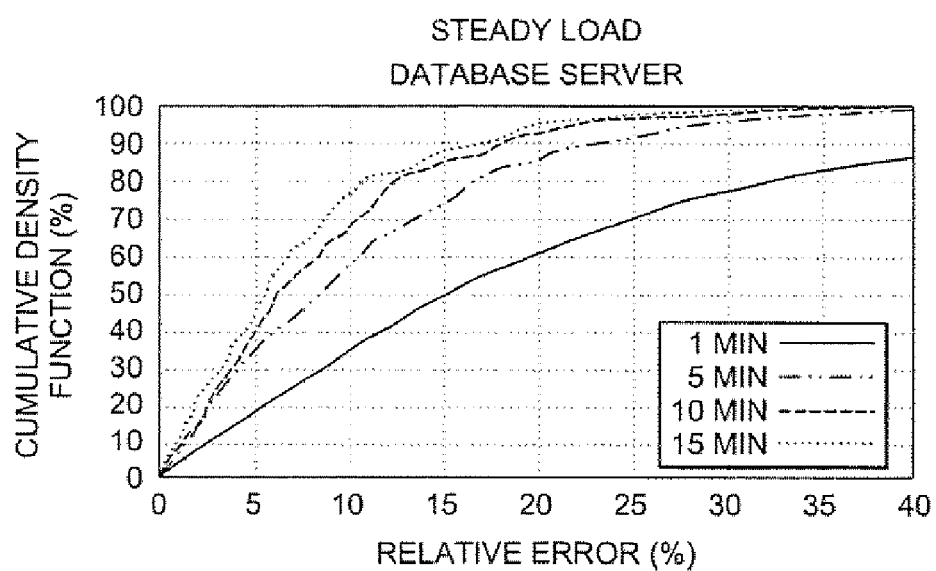

FIGS. 10A-10C and 11A-11C show graphs illustrating the CDF of the relative errors for the front server and the database server under different lengths of monitoring window and the three TPC-W transaction mixes: browsing, shopping, and ordering. These performance results can be summarized for this exemplary case study as follows:

The approximation of CPU transaction cost at the front server is of higher accuracy than that at the Database server. For the three TPC-W transaction mixes, the relative errors of the CPU cost approximation at the database server is higher than that at the front server. Partially, this reflects a higher variance in the CPU service time at the database tier for the same transaction type. The relative errors of the CPU cost approximation at the database server is lower for shopping and ordering mixes as shown in FIGS. 11B and 11C, while at the front server, the relative errors are lower for the browsing mix, see FIG. 10A;

Larger T achieves higher accuracy. The larger monitoring windows T work better, especially at the database server. For example, for browsing and shopping mixes, with T=1 min, the percentage of monitoring windows at the database server that show less than 20% of relative errors are 50% and 70%, respectively. With T=15 min, the percentage of monitoring windows at the database server with the same relative errors (less than 20%) increases to 83% and 89%, respectively. Larger T allows us to find a better "average" approximation for a variable CPU service time for the same transaction type. A larger monitoring window T has less impact at the front server. However, for the browsing mix, it still provides a reasonable improvement: with T=15 min 87% of monitoring windows show less than 10% of relative error compared to 77% of windows in the same error range when T=1 min.

By considering; "worst"/"best" numbers across the three transaction mixes and using a larger monitoring window T=15 min, we can summarize the accuracy of regression results for approximating the CPU transaction cost for this exemplary case study as follows:

at the front server: 87%-98% of monitoring windows have relative errors less than 15%;

at the database server: 79%-89% of monitoring windows show relative errors less than 20%.

Now, we turn our attention to the impact of workload type on the accuracy of regression in this exemplary case study. As our more detailed analysis indicates that the CPU service time might be load dependent, we evaluate this conjecture by splitting regression equations into two sets according to their corresponding loads. Measurements from experiments with less than or equal to 200 EBs are used to get CPU costs under light load, and data from experiments with larger than 200 EBs are used to get the costs under steady load. Here, we do not partition equations and results according to different workload mixes, but rather present the overall (combined) impact of all mixes on the accuracy of CPU transaction cost approximation.

FIGS. 12A-12B and 13A-13B show graphs presenting the combined CDF of relative errors across the three TPC-W mixes: browsing, shopping, and ordering, under light load and steady load. Comparing these figures, we can summarize the observations as follows:

The approximation of CPU transaction cost is much more accurate when the regression is done separately for different workload rates. This observation holds for both the front and the database servers.

The approximation of CPU transaction cost is less accurate under the "light" workload rates. Partially, it is due to a smaller number of transactions per monitoring window, and at the same time, higher variance of processing time in a lightly loaded system.

This means that in the modeling exercise one can use the transaction cost as a function of load, e.g., use two-values transaction cost for low and steady load areas. Overall, we demonstrated through analysis of this exemplary case study that regression provides a simple and powerful solution to accurately approximate CPU transaction costs, especially with appropriately tuned monitoring window size and with the workload rates (or system load) taken into account.

Our next step in this case study is to use the results of the regression method to parameterize an analytic model of queues to enable dynamic evaluation of required system resources under changing workload conditions. For the TPC-W benchmark and most production multi-tier services, CPU is a typical system bottleneck. However, in practice, when one needs to make a projection of the maximum achievable system throughput, additional "back of the envelope" computations for estimating memory and network requirements under the maximum number of concurrent clients are performed to justify this maximum throughput projection. In the below discussion, we explore further the use of such an analytic model of queues that is parameterized with a regression method for performing dynamic evaluation of system resource capacity required for serving changing workloads, and we perform an exemplary detailed performance case study comparing the accuracy of an implementation of an analytic model for resource usage evaluation (according to an embodiment of the present invention) with the real system results.

Figure 14:
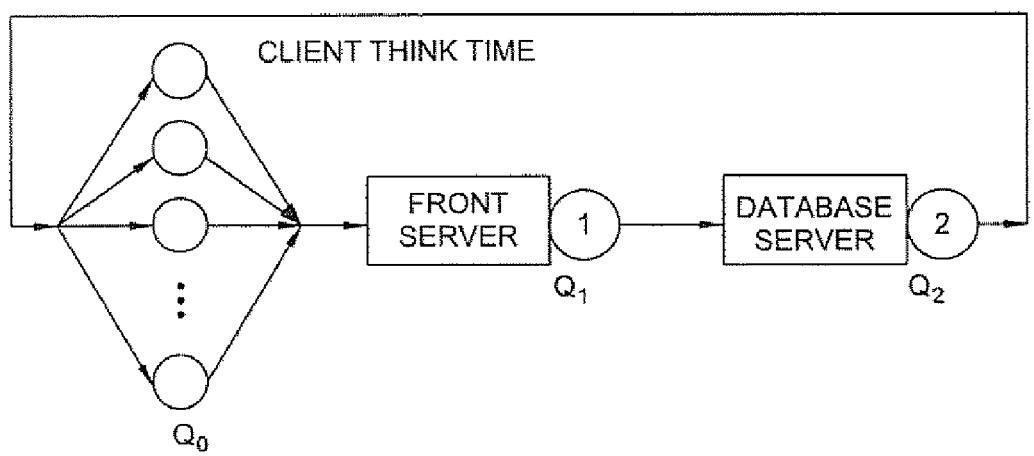
FIG. 14 shows an exemplary analytic model that models a multi-tier system as a closed system with a network of queues in accordance with one embodiment of the present invention.

Because of the upper limit on the number of simultaneous connections at a web server (which is reflected by the fixed number of EBs in the TPC-W benchmark), the system can be modeled as a closed system with a network of queues, see FIG. 14. According to certain embodiments, client think time is modeled as an infinite queue $Q_0$, the front server 502 in this exemplary case study is modeled as $Q_1$, and the database server 503 is modeled as $Q_2$.

The number of clients in the system is fixed and circulate in the network. According to one embodiment, the analytic model is solved for finding the response time with a fixed number of clients (such as the number clients whose activities are reflected in the representative workload 18). If the analytic model determines that the response time of the computing system under analysis satisfies given QoS desires, then the number of clients is increased and the model is solved again. In such a way, the number of clients can be iteratively adjusted and the analytic model may be used to find the maximum number of clients that the computing system under analysis can handle while still supporting the desired QoS.

When a client receives a response from the server, it issues another request after certain think time, i.e., after spending some time at $Q_0$. One could argue that since some of the requests are satisfied at the front server tier, i.e., $Q_1$, therefore one may argue that there should be direct flow from $Q_1$ back to $Q_0$. However, this is not needed in this exemplary case study since we do not model each single visit at each tier, but an aggregated service time spent in each tier by a transaction.

When a client receives a response from the server, it waits for a certain think time, and then issues another request. Once the service time in each queue is obtained, this closed system can be solved efficiently by the Mean-Value Analysis (MVA) algorithm, a classic algorithm for solving closed product-form networks, see B. Urgaoukar, G. Pacifici, P. Shenoy, M. Spreitzer, and A. Tautawi, "An Analytical Model for Multi-tier Internet Services and its Applications", In *Proc. of the ACM SIGMETRICS* 2005, Banff, Canada, June 2005, the disclosure of which is incorporated herein by reference. This model takes as inputs the think time in $Q_0$ and the service demands of $Q_1$ and $Q_2$, and provides average system throughput, average transaction response time, and average queue length in each queue. The think time in $Q_0$ is defined by the TPC-W benchmark as exponentially distributed with mean equal to 7 seconds, this is the value used in all experiments of this exemplary case study. In production systems, this value can be measured on-line or extracted by analyzing historic data. According to one embodiment, the average service demand at tier n is computed as follows. First, the CPU cost $C_{i,n}$ is obtained by regression for all i and all n. After calculating the transaction mix distribution vector X (as discussed above), the overall service demands at tier n is given by;

$$S_n = \sum_{i=1}^{i+1} \pi_i \cdot C_{i,n} \quad (5)$$

The above value, $S_n$, is used by the MVA model to evaluate the maximum achievable system throughput for the three TPC-W transaction mixes: browsing, shopping, and ordering.

We also evaluate an accuracy and performance of an embodiment of our transaction-based simulation model introduced above. Here, we briefly describe its basic functionality. After a certain think time (exponentially distributed) in $Q_0$, the client 501 sends a transaction to the front server 502. The transaction type i is randomly selected according to the stationary probabilities π of the browsing, shopping, or ordering mixes. Then, in $Q_1$, the front server 502 processes this transaction with an exponentially distributed service time with mean equal to $C_{i,front}$ of the front server 502, i.e., the approximated CPU cost of transaction type i as determined by regression. If this transaction type issues a query to the database server 503, then in $Q_2$ the database server 503 processes it and sends the reply back to the client 501. The service time at the database server 503 is exponentially distributed with mean equal to $C_{i,db}$, this value is also provided by regression.

Figure 15A:
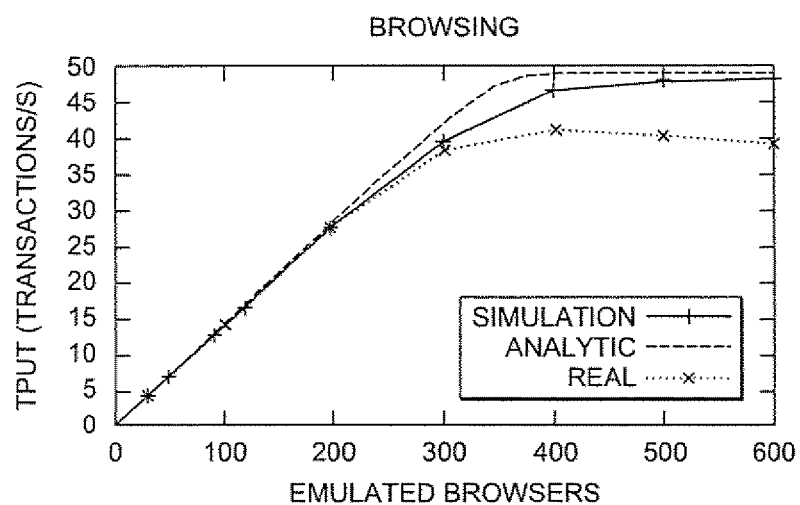
FIGS. 15A-15C show graphs comparing results for average throughput of an analytic model of an embodiment of the present invention with simulation model and real system under the three TPC-W transaction mixes, respectively, according to this exemplary case study.
Figure 15B:
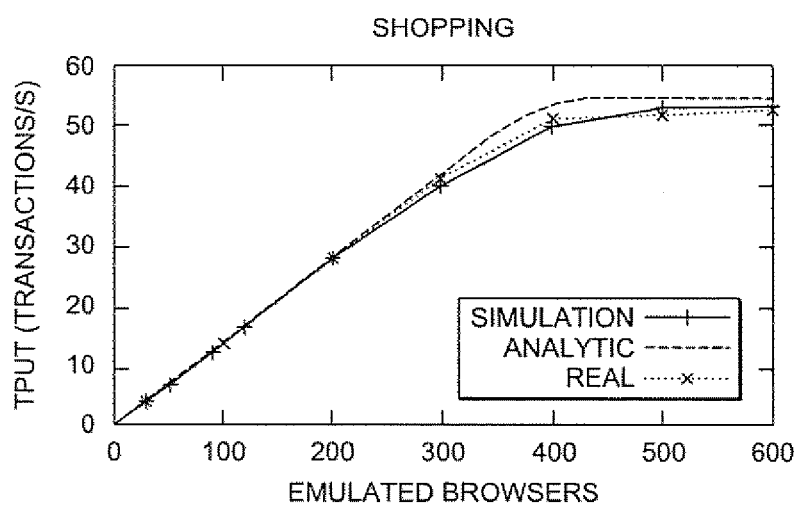
Figure 15C:
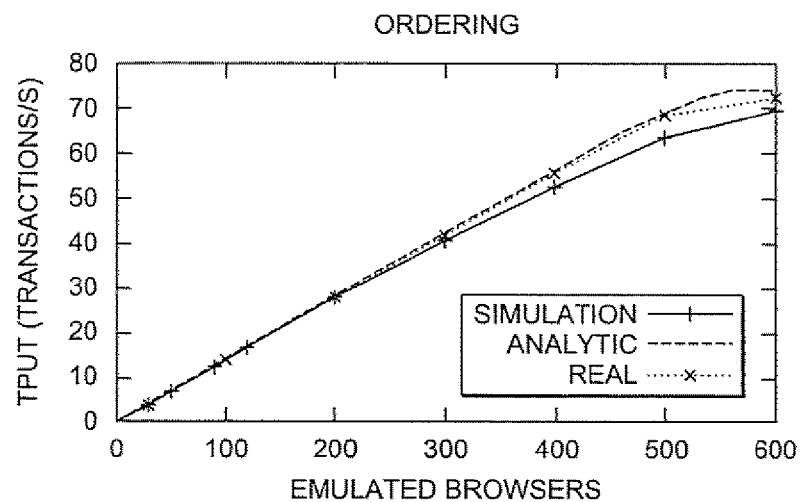

FIGS. 15A-15C show graphs comparing the analytic results with the simulation of the detailed session-based model and experimental measurements of the real system for this exemplary case study. The results of the analytic model perfectly match the experimental results for the shopping and ordering mixes. The results also validate the simplified transaction-based model: its performance results are also in excellent agreement with experimental values.

For the browsing mix, both analytic and simulation models predict higher system throughput than the measured one in this exemplary case study. The reason that the two models do not do as well for the browsing mix in this example relates to the bottleneck switching behavior for browsing mix under higher loads (recall that this phenomenon was previously discussed and demonstrated herein above). However, even for this challenging case with a continuous bottleneck switch, the error remains contained within 15%, providing a close answer to the fundamental problem of how many simultaneous sessions can be concurrently supported by the system.

Once we approximated the CPU cost of different client transactions at different tiers, then we could use these cost functions for evaluating the resource requirement of scaled or modified transaction workload mix in order to accurately size a future system. Ideally, one would like to use the CPU cost function obtained with the regression method under a first workload mix, "WorkloadMix_1," to predict the system behavior under a different workload mix, "WorkloadMix_2." Below, we assess the accuracy of performance predictions under drastic changes in the workload using the exemplary embodiment of the analytic model employed in the above case study.

Figure 16A:
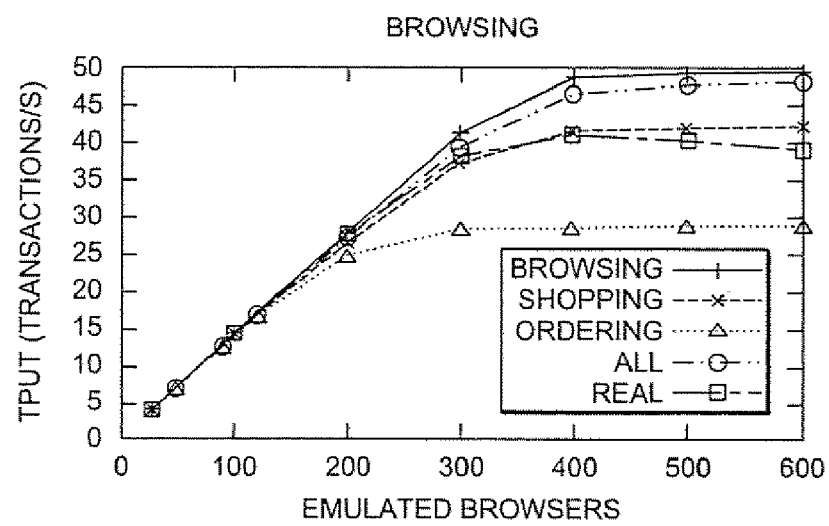
FIGS. 16A-16C show graphs comparing performance results when the analytic model of an embodiment of the present invention is parameterized with different CPU transaction cost models under the three TPC-W transaction mixes, respectively, according to this exemplary case study.
Figure 16B:
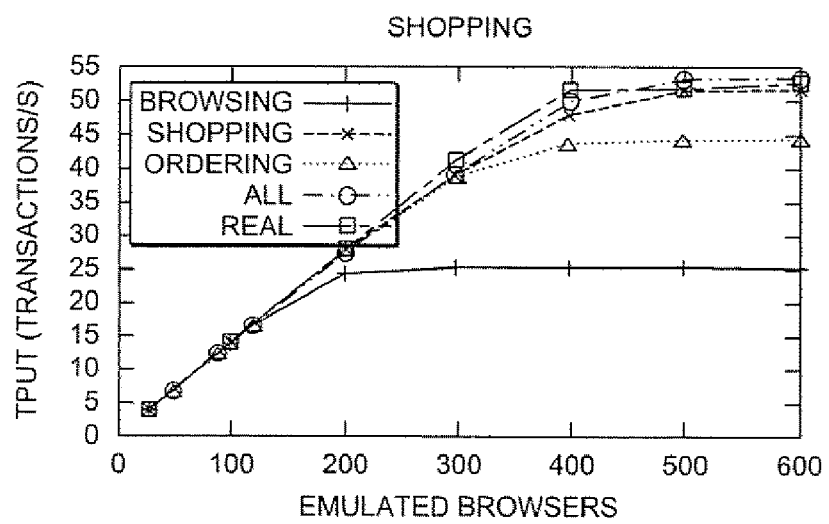
Figure 16C:
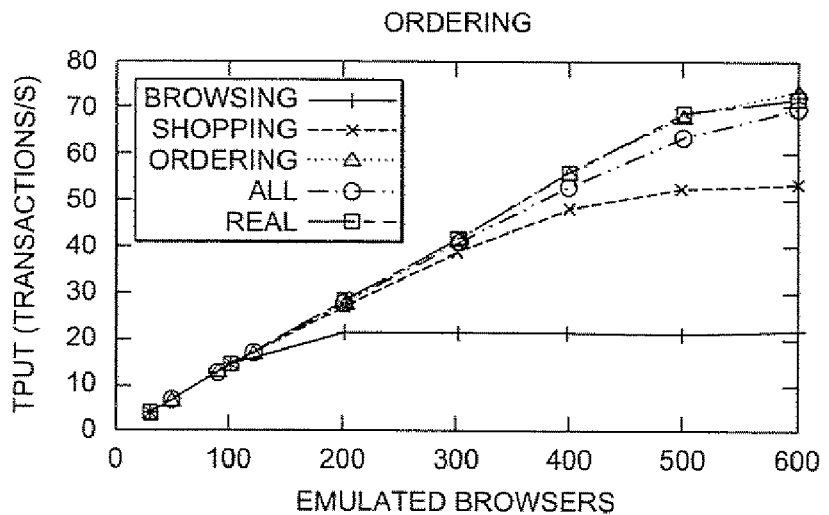

FIGS. 16A-16C show graphs presenting the system average throughput under different workload mixes. The lines on the graphs have the following meaning:

the line labeled "browsing" ("shopping" or "ordering") means that the model is parameterized with CPU transaction costs derived with regression from the system that is processing the browsing mix (shopping or ordering mix respectively);

the line labeled "all" means that the model is parameterized with CPU transaction costs derived with regression from the aggregate profile with all three mixes. It mimics the situation when the workload mix is changing and varying over time, i.e., when the system is processing over different periods of time either browsing, or shopping, or ordering transaction mixes;

the line labeled "real" reflects measured performance of the real system.

The observations from the modeling results in this case study can be summarized as follows:

The cost function "all" obtained from the aggregate profile of all the workload mixes gives excellent results for a diverse set of workloads. The maximum error with this cost function occurs when it is used to approximate system performance under the browsing mix. For the browsing mix, the model overestimates performance by 15%. The reason that the product form model does not do we well here is the bottleneck switching behavior, as discussed above.

The cost function obtained by the profile of a stable workload mix gives excellent accuracy for the same workload mix. The relative error is under 2% when using the cost function from the shopping (or ordering) profile into the shopping (or ordering) simulation.

The transaction cost function should not be applied to a very different workload mix compared to the mix it was derived from. For example, the relative error of the average throughput reaches 80% when the cost function from the browsing mix profile is used to simulate the ordering mix. This observation deserves further examination. In general, modeling results related to the browsing mix appear less accurate and this is explained by the continuous bottleneck switching at higher loads. Instead, when we used the "shopping" cost function to approximate system throughput under the ordering mix and vice versa, the error is contained within 20%—in these cases the errors come from the (inevitably) inaccurate approximations of the cost. Note that in the exemplary TPC-W traffic mixes used in this case study, the shopping and ordering mixes have 80%-20% and 50%-50% of transactions of the browsing and ordering types respectively (see the discussion of the TPC-W traffic mixes above), so transactions from both classes are represented well in the overall mix (compared to 95%-5% ratio in the browsing mix). Thus, this reflects that to obtain the accurate approximation of CPU transaction cost, it is desirable for the regression method to have a representative number of these transactions in the workload.

As the system and its workload evolve over time, continuously aggregated measurements like the ones used in cost function "all" allow to "adjust" the cost function and significantly improve model prediction.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 17:
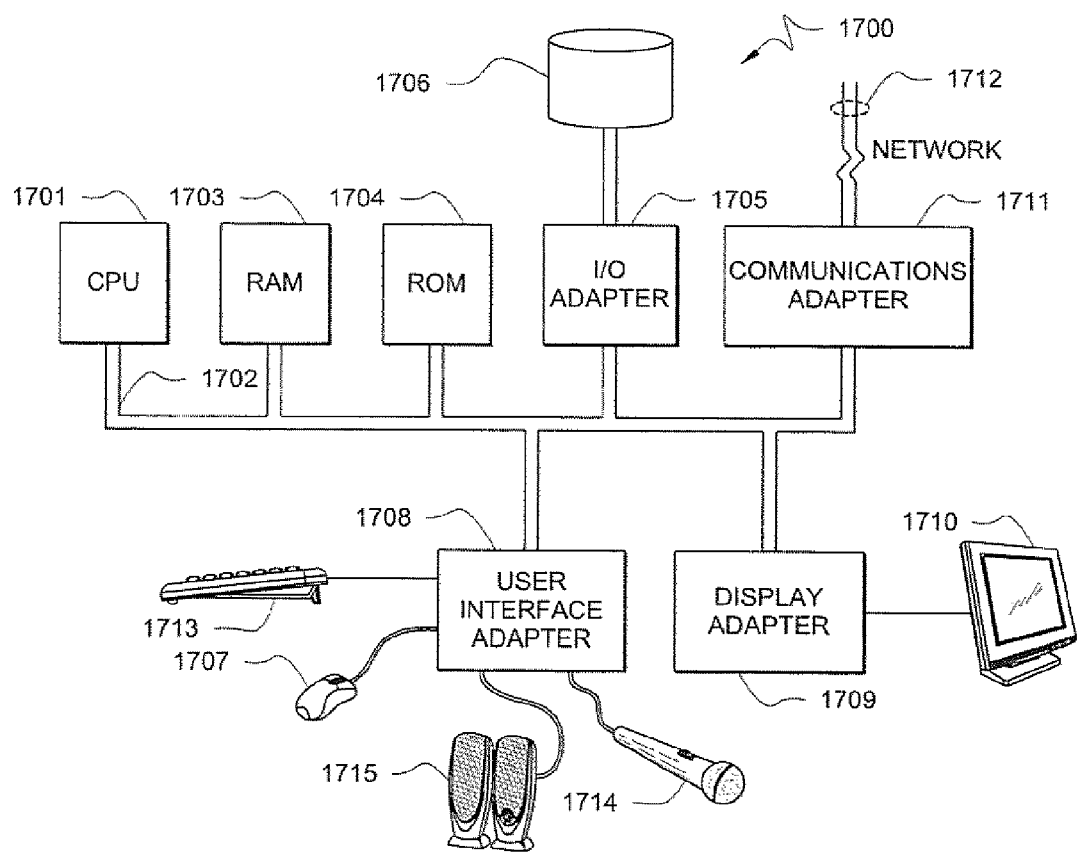
FIG. 17 shows an exemplary system on which a embodiments of the present invention may be implemented.

FIG. 17 illustrates an exemplary computer system 1700 on which the analytic model generator 12, resource cost calculator 14, and/or capacity analyzer 16 may be implemented according to one embodiment of the present invention, Central processing unit (CPU) 1701 is coupled to system bus 1702. CPU 1701 may be any general-purpose CPU. The present invention is not restricted by the architecture of CPU 1701 (or other components of exemplary system 1700) as long as CPU 1701 (and other components of system 1700) supports the inventive operations as described herein. CPU 1701 may execute the various logical instructions according to embodiments of the present invention. For example, CPU 1701 may execute machine-level instructions according to the exemplary operational flows described above in conjunction with FIGS. 3-4.

Computer system 1700 also preferably includes random access memory (RAM) 1703, which may be SRAM, DAM, SDRAM, or the like. Computer system 1700 preferably includes read-only memory (ROM) 1704 which may be PROM, EPROM, EEPROM, or the like. RAM 1703 and ROM 1704 hold user and system data and programs, as is well known in the art.

Computer system 1700 also preferably includes input/output (I/O) adapter 1705, communications adapter 1711, user interface adapter 1708, and display adapter 1709. I/O adapter 1705, user interface adapter 1708, and/or communications adapter 1711 may, in certain embodiments, enable a user to interact with computer system 1700 in order to input information, such as QoS desires and/or other planning parameters of a service provider.

I/O adapter 1705 preferably connects to storage device(s) 1706, such as one or more of hard drive, compact disc (CD) drive, floppy disk drive, tape drive, etc. to computer system 1700. The storage devices may be utilized when RAM 1703 is insufficient for the memory requirements associated with storing data for operations of the analytic model generator 12, resource cost calculator 14, and/or capacity analyzer 16 (e.g., representative workload 18, client-access behavior information 13, transaction-based analytic model 15, etc.). Communications adapter 1711 is preferably adapted to couple computer system 1700 to network 1712, which may enable information to be input to and/or output from system 1700 via such network 1712 (e.g., the Internet or other wide-area network, a local-area network, a public or private switched telephony network, a wireless network, any combination of the foregoing). For instance, a representative workload 18 may be input to system 1700 via network 1712 from a remote computer (e.g., from the computing system 11 under analysis), and/or a determined transaction-based analytic model 15 and/or capacity information determined from such transaction-based analytic model 15 may be output and communicated via network 1712 to a remote computer (e.g., to session-based system 11, resource provisioning controller 102, and/or admission controller 103). User interface adapter 1708 couples user input devices, such as keyboard 1713, pointing device 1707, and microphone 1714 and/or output devices, such as speaker(s) 1715 to computer system 1700. Display adapter 1709 is driven by CPU 1701 to control the display on display device 1710 to, for example, display information regarding the determined capacity analysis of a session-based system 11 according to certain embodiments of the present invention.

It shall be appreciated that the present invention is not limited to the architecture of system 1700. For example, any suitable processor-based device may be utilized for implementing analytic model generator 12, resource cost calculator 14, and/or capacity analyzer 16, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method for deriving an analytic model for a session-based system, the method comprising:
receiving, by a model generator, client-access behavior information for the session-based system, wherein the session-based system supports a plurality of interdependent transaction types, and wherein said client-access behavior information comprises transition probabilities of the plurality of interdependent transaction types; and
deriving, by the model generator, from the transition probabilities of the plurality of interdependent transaction types, a stateless transaction-based analytic model of the session-based system, wherein the derived transaction-based analytic model models resource requirements of the session-based system for servicing a workload,
wherein said deriving further comprises determining, from the transition probabilities, a vector $\pi_i$ that represents a steady-state probability for the plurality of interdependent transaction types, and
wherein the determined vector, $\pi_i$, gives the overall percentage of the interdependent transactions of type i in the workload of the session-based system.

2. The method of claim 1, wherein said workload of the session-based system comprises a historical workload previously encountered by the session-based system.

3. The method of claim 1, wherein said deriving further comprises:
determining a closed system of a network of queues based on the determined steady-state probability of the interdependent transaction types.

4. The method of claim 1 further comprising:
determining said client-access behavior information from a historical workload encountered by the session-based system.

5. The method of claim 1 wherein the interdependent transaction types are transaction types of an application hosted by the session-based system.

6. The method of claim 5 wherein the application comprises an e-commerce application, and wherein the interdependent transaction types include one or more of the following transaction types:
searching for a product; selecting a product; inputting shipping information; arranging payment agreement; receiving a confirmation; home; new products; best sellers; product detail; search request; search results; shopping cart; customer registration; buy request; buy confirm; order inquiry; order display; admin request; and admin confirm.

7. The method of claim 1 further comprising:
determining a corresponding resource cost for each of the interdependent transaction types.

8. The method of claim 7 wherein said determining said corresponding resource cost comprises:
receiving a representative workload of the session-based system; and
employing a regression-based analysis for approximating the corresponding resource cost for each of the interdependent transaction types.

9. The method of claim 8 wherein said resource cost includes CPU and memory demands.

10. The method of claim 7 further comprising:
parameterizing the stateless transaction-based analytic model of the session-based system based on the determined resource costs of the interdependent transaction types.

11. The method of claim 10 wherein the parameterized transaction-based model reflects capacity of the session-based system that is consumed for serving the workload under analysis.

12. The method of claim 1 wherein the stateless transaction-based model treats each transaction, of said plurality of interdependent transaction types, in the workload of the session-based system as if totally independent of other transactions.

13. A method for performing capacity analysis of a session-based system, the method comprising:
receiving, by a capacity analyzer, a representative workload of the session-based system, wherein the session-based system hosts at least one application supporting a plurality of interdependent transaction types;
generating a stateless transaction-based analytic model of the session-based system from transition probabilities of the plurality of interdependent transaction types observed for the session-based system, wherein the generated transaction-based analytical model models resource requirements of the session based system for servicing a workload, and
wherein said generating comprises determining, from the transition probabilities, a vector $\pi_i$ that represents a steady-state probability for the plurality of interdependent transaction types; and
wherein the determined vector, $\pi_i$ gives the overall percentage of the interdependent transactions of type i in the representative workload of the session-based system;
determining, by said capacity analyzer, from the transaction-based analytic model of the session-based system, capacity of the session-based system for supporting the representative workload; and
performing at least one action based at least in part on or responsive to the determined capacity of the session-based system for supporting the representative workload.

14. The method of claim 13 wherein the performing said at least one action comprises at least one of:
outputting, by said capacity analyzer, information reflecting the determined capacity of the session-based system for supporting the representative workload;
dynamically provisioning resources for said session-based system based at least in part on the determined capacity of the session-based system for supporting the representative workload; and
communicating said determined capacity of the session-based system for supporting the representative workload from said capacity analyzer to another processor-based device.

15. The method of claim 13 wherein the representative workload comprises a historical workload previously encountered by the session-based system.

16. The method of claim 13, wherein said generating further comprises:
determining a closed system of a network of queues based on the determined steady-state probability of the interdependent transaction types.

17. The method of claim 13 further comprising:
employing a regression-based analysis for approximating a corresponding resource cost for each of the interdependent transaction types; and
parameterizing the transaction-based analytic model of the session-based system based on the determined resource costs of the interdependent transaction types.

18. The method of claim 17 wherein the parameterized transaction-based model reflects capacity of the session-based system that is consumed for serving the representative workload under analysis.

19. The method of claim 13 wherein the transaction-based model treats each transaction, of said plurality of interdependent transaction types, in the representative workload of the session-based system as if totally independent of other transactions.

20. A system comprising:
a computer-readable non-transitory medium on which client-access behavior information for a session-based system is stored, wherein the session-based system hosts at least one application that supports a plurality of interdependent transaction types, and wherein said client-access behavior information comprises transition probabilities of the plurality of interdependent transaction types;
a resource cost calculator for receiving a representative workload and determining from the representative workload a corresponding resource cost of the session-based system for each of the plurality of interdependent transaction types; and
an analytic model generator for deriving, based at least on the transition probabilities of the plurality of interdependent transaction types and the corresponding resource cost of the plurality of interdependent transaction types, a stateless transaction-based analytic model of the session-based system, wherein the derived transaction-based analytic model models resource requirements of the session-based system for servicing a workload,
wherein said analytic model generator determines, from the transition probabilities, a vector $\pi_i$ that represents a steady-state probability for the plurality of interdependent transaction types, and
wherein the determined vector, $\pi_i$ gives the overall percentage of the interdependent transactions of type i in the representative workload of the session-based system.

21. The system of claim 20 wherein said analytic model generator parameterizes the stateless transaction-based analytic model of the session-based system based on the determined resource costs of the interdependent transaction types.

* * * * *